United States Patent
You

(10) Patent No.: US 12,328,791 B2
(45) Date of Patent: Jun. 10, 2025

(54) METHOD FOR DETERMINING HIDDEN NODE AND APPARATUS

(71) Applicant: HUAWEI TECHNOLOGIES CO., LTD., Guangdong (CN)

(72) Inventor: Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 17/749,881

(22) Filed: May 20, 2022

(65) Prior Publication Data

US 2022/0279336 A1    Sep. 1, 2022

Related U.S. Application Data

(63) Continuation of application No. PCT/CN2019/120716, filed on Nov. 25, 2019.

(51) Int. Cl.
*H04W 8/00* (2009.01)
*H04B 17/318* (2015.01)
(Continued)

(52) U.S. Cl.
CPC .......... *H04W 8/005* (2013.01); *H04B 17/318* (2015.01); *H04W 72/1263* (2013.01); *H04W 72/542* (2023.01); *H04W 92/18* (2013.01)

(58) Field of Classification Search
CPC ............. H04W 8/005; H04W 72/1263; H04W 72/542; H04W 92/18; H04W 88/04; H04B 17/318
See application file for complete search history.

(56) References Cited

U.S. PATENT DOCUMENTS

2014/0073314 A1    3/2014  Pradas et al.
2016/0302230 A1*  10/2016  Novlan ............... H04L 27/0006
(Continued)

FOREIGN PATENT DOCUMENTS

CN        105392202 A    3/2016
CN        106550395 A    3/2017
(Continued)

OTHER PUBLICATIONS

PCT International Search Report and Written Opinion issued in International Application No. PCT/CN2019/120716 on Feb. 18, 2020, 15 pages (with English translation).
(Continued)

*Primary Examiner* — Edan Orgad
*Assistant Examiner* — Vladislav Y Agureyev
(74) *Attorney, Agent, or Firm* — Fish & Richardson P.C.

(57) ABSTRACT

A method for determining a hidden node and an apparatus are provided. It is set that a first terminal device performs sidelink communication with a second terminal device, the first terminal device is an initiator of the sidelink communication, and the second terminal device is a receiver of the sidelink communication. The method includes: The communication apparatus obtains a first measurement result of the first terminal device and a second measurement result of the second terminal device; and the communication apparatus determines, based on the first measurement result and the second measurement result, whether there is a hidden node for the second terminal device.

20 Claims, 8 Drawing Sheets

S501: A communication apparatus obtains a first measurement result of a first terminal device and a second measurement result of a second terminal device S502: The communication apparatus determines, based on the first measurement result and the second measurement result, that there is a hidden node of the second terminal device

(51) Int. Cl.
*H04W 72/1263* (2023.01)
*H04W 72/542* (2023.01)
*H04W 92/18* (2009.01)

(56) References Cited

U.S. PATENT DOCUMENTS

| | | | | |
|---|---|---|---|---|
| 2018/0124622 | A1* | 5/2018 | Van Der Velde | H04B 17/345 |
| 2018/0220318 | A1* | 8/2018 | Uemura | H04B 17/318 |
| 2019/0059019 | A1* | 2/2019 | Wallentin | H04W 28/0278 |
| 2019/0074916 | A1* | 3/2019 | Zhang | H04W 48/16 |
| 2019/0215867 | A1* | 7/2019 | Cheng | H04W 8/005 |
| 2020/0120458 | A1* | 4/2020 | Aldana | H04W 12/069 |
| 2020/0235848 | A1* | 7/2020 | Nguyen | H04L 1/0038 |
| 2020/0236655 | A1* | 7/2020 | Bharadwaj | H04L 5/0051 |
| 2020/0252820 | A1* | 8/2020 | Ozturk | H04W 36/0094 |
| 2020/0395991 | A1* | 12/2020 | Ryu | H04W 52/16 |
| 2021/0029761 | A1* | 1/2021 | Jung | H04W 72/02 |
| 2021/0105817 | A1* | 4/2021 | Nguyen | H04W 74/0816 |
| 2021/0219268 | A1* | 7/2021 | Li | H04B 17/318 |
| 2021/0219320 | A1* | 7/2021 | Belleschi | H04W 72/20 |
| 2021/0297128 | A1* | 9/2021 | Badic | G01S 5/0284 |
| 2022/0304056 | A1* | 9/2022 | Harada | H04L 5/0007 |

FOREIGN PATENT DOCUMENTS

| | | |
|---|---|---|
| CN | 107277848 A | 10/2017 |
| WO | 2018153451 A1 | 8/2018 |
| WO | 2019174742 A1 | 9/2019 |

OTHER PUBLICATIONS

CMCC, "Discussion on Resource Allocation Mechanism for NR V2X," 3GPP TSG RAN WG1 Meeting #95, R1-1812880, Spokane, USA, Nov. 12-16, 2018, 4 pages.

Extended European Search Report issued in European Application No. 19954477.6 on Sep. 21, 2022, 12 pages.

Huawei, HiSilicon, "Sidelink Resource Allocation Mode 1," 3GPP TSG RAN WG1 Meeting #99, R1-1911883, Reno, USA, Nov. 18-22, 2019, 24 pages.

* cited by examiner

S501: A communication apparatus obtains a first measurement result of a first terminal device and a second measurement result of a second terminal device S502: The communication apparatus determines, based on the first measurement result and the second measurement result, that there is a hidden node of the second terminal device

METHOD FOR DETERMINING HIDDEN NODE AND APPARATUS

CROSS-REFERENCE TO RELATED APPLICATIONS

This application is a continuation of International Application No. PCT/CN2019/120716, filed on Nov. 25, 2019, the disclosure of which is hereby incorporated by reference in its entirety.

TECHNICAL FIELD

Embodiments of this application relate to the field of communication technologies, and in particular, to a method for determining a hidden node and an apparatus.

BACKGROUND

Currently, detection on a hidden node is mainly to avoid interference to a Uu air interface. For example, before sending data to a terminal device, a network device detects whether there is a hidden node near the terminal device. If there is a hidden node near the terminal device, receiving performed by the terminal device is affected. However, in a sidelink (sidelink, SL) scenario, there is no related solution for determining a hidden terminal on a receiving device side.

SUMMARY

According to a first aspect, a method for determining a hidden node and an apparatus are provided. It is set that a first terminal device performs sidelink SL communication with a second terminal device in a first frequency range, the first terminal device is an initiator of the SL, and the second terminal device is a receiver of the SL. A communication apparatus may be used for the first terminal device, the second terminal device, and a network device. The method includes: The communication apparatus obtains a first measurement result of the first terminal device and a second measurement result of the second terminal device; and the communication apparatus determines, based on the first measurement result and the second measurement result, whether there is a hidden node for the second terminal device. The first measurement result is determined by the first terminal device based on an RSSI obtained through measurement in the first frequency range, and the second measurement result is determined by the second terminal device based on an RSSI obtained through measurement in the first frequency range.

In a feasible design, the first measurement result may include a first RSSI, and the second measurement result may include a second RSSI, where the first RSSI is an average value of one or more RSSIs obtained by the first terminal device through measurement in the first frequency range, and the second RSSI is an average value of one or more RSSIs obtained by the second terminal device through measurement in a second frequency range. The communication apparatus may determine, based on the first RSSI or the second RSSI, whether there is the hidden node for the second terminal device. For example, if a difference between the first RSSI and the second RSSI is greater than or equal to a first threshold, the communication apparatus determines that there is the hidden node for the second terminal device. If the difference between the first RSSI and the second RSSI is less than the first threshold, the communication apparatus determines that there is no hidden node for the second terminal device.

In a feasible design, the first measurement result may include a first channel occupancy, and the second measurement result may include a second channel occupancy, where the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range, and the second channel occupancy is a ratio of a quantity of RSSIs that are obtained by the second terminal device through measurement in the first frequency range and that are greater than a threshold to a total quantity of RSSIs obtained by the second terminal device through measurement in the first frequency range. The communication apparatus may determine, based on the first channel occupancy and the second channel occupancy, whether there is the hidden node for the second terminal device. For example, if a difference between the second channel occupancy and the first channel occupancy is greater than or equal to a second threshold, the communication apparatus may determine that there is the hidden node. If the difference between the second channel occupancy and the first channel occupancy is less than the second threshold, the communication apparatus determines that there is no hidden node for the second terminal device.

In a feasible design, when there is the hidden node for the second terminal device, the communication apparatus may further determine, based on the first channel occupancy and the second channel occupancy, a level of impact of the hidden node on the sidelink between the first terminal device and the second terminal device. For example, a greater difference between the first channel occupancy and the second channel occupancy indicates greater impact, and a smaller difference between the first channel occupancy and the second channel occupancy indicates smaller impact.

In a possible design, the communication apparatus is used for the network device. To be specific, the network device may perform the method in the first aspect. The network device may obtain the first measurement result of the first terminal device and the second measurement result of the second terminal device in the following manner: The network device receives a first measurement report and a second measurement report from the second terminal device, where the first measurement report carries the first measurement result, and the second measurement report carries the second measurement result. Alternatively, the network device receives a third measurement report from the second terminal device, where the third measurement report carries the first measurement result and the second measurement result.

Alternatively, the network device may receive a first measurement report and a second measurement report from the first terminal device, where the first measurement report carries the first measurement result, and the second measurement report carries the second measurement result. Alternatively, the network device receives a fourth measurement report from the first terminal device, where the fourth measurement report carries the first measurement result and the second measurement result.

Alternatively, the network device may receive a first measurement report from the first terminal device and a second measurement report from the second terminal device, where the first measurement report carries the first measurement result, and the second measurement report carries the second measurement result.

In a possible design, the communication apparatus is used for the second terminal device. To be specific, the second terminal device may perform the method in the first aspect. The second terminal device may obtain the first measurement result of the first terminal device and the second measurement result of the second terminal device in the following manner: The second terminal device receives a first measurement report from the first terminal device, where the first measurement report carries the first measurement result; and the second terminal device may obtain the second measurement result through RSSI measurement. Optionally, the second terminal device may perform RSSI measurement in the first frequency range based on second RSSI measurement configuration information; and obtain the second measurement result based on a result of the RSSI measurement. Optionally, in this design, to enable the network device to obtain a status of the hidden node, the second terminal device may further send first indication information to the network device, where the first indication information may include one or more of the following information: indication information used to indicate whether there is the hidden node, identifier information of the first frequency range, identifier information of the first terminal device, identifier information of the second terminal device, indication information indicating the level of the impact of the hidden node on the sidelink communication between the first terminal device and the second terminal device, and identifier information of a sidelink that is between the first terminal device and the second terminal device and that is used for sidelink communication.

In a possible design, the communication apparatus is used for the first terminal device. To be specific, the first terminal device may perform the method in the first aspect. The first terminal device may obtain the first measurement result of the first terminal device and the second measurement result in the following manner: The first terminal device receives a second measurement report from the second terminal device, where the second measurement report carries the second measurement result; and the first terminal device obtains the first measurement result through RSSI measurement. Optionally, the first terminal device may perform RSSI measurement based on first RSSI measurement configuration information; and obtain the first measurement result based on a result of the RSSI measurement. Optionally, in this design, to enable the network device to obtain a status of the hidden node, the first terminal device may send second indication information to the network device, where the second indication information may include one or more of the following information: indication information used to indicate whether there is the hidden node, identifier information of the first frequency range, identifier information of the first terminal device, identifier information of the second terminal device, indication information indicating the level of the impact of the hidden node on the sidelink communication between the first terminal device and the second terminal device, and identifier information of a sidelink that is between the first terminal device and the second terminal device and that is used for sidelink communication.

In a possible design, in the foregoing solution, in addition to the foregoing measurement results, the first measurement report, the second measurement report, the third measurement report, or the fourth measurement report may further include one or more of the following:

the identifier information of the first frequency range, the identifier information of the first terminal device, the identifier information of the second terminal device, and the identifier information of the sidelink that is between the first terminal device and the second terminal device and that is used for sidelink communication.

According to a second aspect, a method for determining a hidden node is provided. The method includes: A second terminal device receives a first measurement report from a first terminal device, where the first measurement report includes a first measurement result; the second terminal device obtains a second measurement result through RSSI measurement; and the second terminal device determines, based on the first measurement result and the second measurement result, whether there is a hidden node for the second terminal device.

In a feasible design, the second terminal device may perform RSSI measurement based on second RSSI measurement configuration information; and obtain the second measurement result based on a result of the RSSI measurement.

In a feasible design, when determining that there is the hidden node, the second terminal device may further send first indication information to a network device, where the first indication information includes one or more of the following: indication information indicating whether there is the hidden node, identifier information of a first frequency range, identifier information of the first terminal device, identifier information of the second terminal device, indication information indicating a level of impact of the hidden node on sidelink communication between the first terminal device and the second terminal device, and identifier information of a sidelink that is between the first terminal device and the second terminal device and that is used for sidelink communication.

According to a third aspect, a method for determining a hidden node is provided. The method includes: A second terminal device receives a first measurement report from a first terminal device, where the first measurement report includes a first measurement result; the second terminal device obtains a second measurement report through RSSI measurement, where the second measurement report includes a second measurement result; and the second terminal device sends the first measurement report and the second measurement report to a network device; or the second terminal device sends a third measurement report to a network device, where the third measurement report includes the first measurement result and the second measurement result.

In a feasible design, the second terminal device may perform RSSI measurement based on second RSSI measurement configuration information; and obtain the second measurement report based on a result of the RSSI measurement.

According to a fourth aspect, a method for determining a hidden node is provided. The method includes: A first terminal device receives a second measurement report from a second terminal device, where the second measurement report carries a second measurement result; the first terminal device determines a first measurement result through RSSI measurement; and the first terminal device determines, based on the first measurement result and the second measurement result, whether there is a hidden node for the second terminal device.

In a possible design, the first terminal device may perform RSSI measurement based on first RSSI measurement configuration information; and obtain the first measurement result based on a result of the RSSI measurement.

In a possible design, when determining that there is the hidden node, the first terminal device may send second indication information to a network device, where the second indication information includes one or more of the following: indication information indicating whether there is the hidden node, identifier information of a first frequency range, identifier information of the first terminal device, identifier information of the second terminal device, indication information indicating a level of impact of the hidden node on sidelink communication between the first terminal device and the second terminal device, and identifier information of a sidelink that is between the first terminal device and the second terminal device and that is used for sidelink communication.

According to a fifth aspect, a method for determining a hidden node is provided. The method includes: A first terminal device receives a second measurement report from a second terminal device, where the second measurement report carries a second measurement result; the first terminal device determines a first measurement report through RSSI measurement; and the first terminal device sends the first measurement report and the second measurement report to a network device; or the first terminal device sends a fourth measurement report to a network device, where the fourth measurement report includes a first measurement result and the second measurement result.

According to a sixth aspect, an apparatus is provided, including a unit or means (means) configured to perform the steps included in any one of the first aspect to the fifth aspect.

According to a seventh aspect, an apparatus is provided, including a processor and an interface circuit. The processor is configured to communicate with another apparatus through the interface circuit, and perform the method provided in any one of the first aspect to the fifth aspect. There are one or more processors.

According to an eighth aspect, an apparatus is provided, including a processor configured to connect to a memory, and configured to invoke a program stored in the memory, to perform the method provided in any one of the first aspect to the fifth aspect. The memory may be located inside the apparatus, or may be located outside the apparatus. In addition, there are one or more processors.

According to a ninth aspect, an apparatus is provided, including at least one processor and at least one memory, where the at least one processor is configured to perform the method provided in any one of the first aspect to the fifth aspect.

According to a tenth aspect, a program is provided. When being executed by a processor, the program is used to perform the method provided in any one of the first aspect to the fifth aspect.

According to an eleventh aspect, a program product such as a computer-readable storage medium is provided, including the program in the tenth aspect.

According to a twelfth aspect, a computer-readable storage medium is provided, including a program. When the program is run by a processor, the method provided in any one of the first aspect to the fifth aspect is performed.

The apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

There are one or more processors, and there are one or more memories.

The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

In the foregoing aspects, whether there is the hidden node for the second terminal device that is used as the receiver of the SL communication may be determined. In addition, if there is the hidden node, a frequency range used for sidelink communication may be reallocated to the first terminal device and the second terminal device, to ensure quality of sidelink communication.

In the foregoing aspects, the first terminal device may perform sidelink communication with the second terminal device on a licensed spectrum, or the first terminal device may perform sidelink communication with the second terminal device on an unlicensed spectrum. The unlicensed spectrum may also be referred to as a shared spectrum, or the like.

Further, in the foregoing aspects, the network device may determine whether there is the hidden node for the second terminal device. Alternatively, the first terminal device may determine whether there is the hidden node for the second terminal device, and send, to the network device, the first indication information that is used to notify the hidden node. Alternatively, the second terminal device may determine whether there is the hidden node for the second terminal device, and send, to the network device, the second indication information that is used to notify the hidden node. It can be learned that a manner of determining the hidden node is flexible, and different manners may be selected for implementation based on an actual situation, so that flexibility is relatively high.

Further, in the manners in the foregoing aspects, in addition to determining whether there is the hidden node for the second terminal device, the level of the impact of the hidden node on the sidelink communication may further be determined, to help the network device flexibly decide. For example, when there is the hidden node, but the impact of the hidden node on the sidelink is little, the network device may still allocate the first frequency range for sidelink communication between the first terminal device and the second terminal device.

DETAILED DESCRIPTION OF EMBODIMENTS

Figure 1:
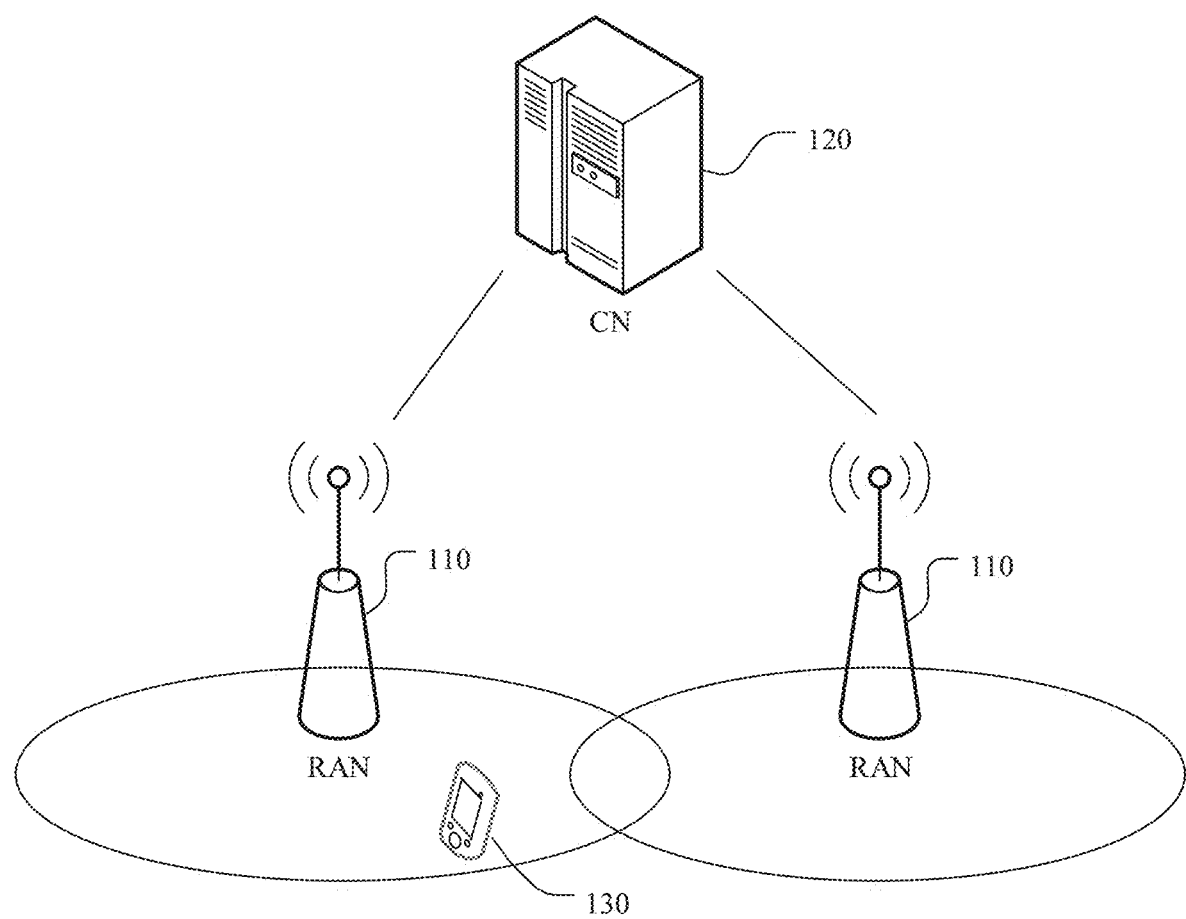
FIG. 1 is a schematic diagram of a communication system according to an embodiment of this application.

FIG. 1 is a schematic diagram of a communication system to which embodiments of this application are applicable. The communication system includes an access network (radio access network, RAN) 110, a core network (core network, CN) 120, and a terminal device 130.

The terminal device 130 accesses a wireless network, to obtain a service of an external network (for example, the Internet) through the wireless network or communicate with another terminal through the wireless network. The wireless network includes the RAN 110 and the CN 120. The RAN 110 is configured to connect the terminal device 130 to the wireless network, and the CN 120 is configured to manage the terminal device and provide a gateway for communicating with the external network.

The terminal device 130, also referred to as user equipment (user equipment, UE), a mobile station (mobile station, MS), a mobile terminal (mobile terminal, MT), or the like, is a device that provides voice/data connectivity to a user, for example, a handheld device or a vehicle-mounted device having a wireless connection function. Currently, some examples of the terminal device are a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

A network device is a device in the wireless network, for example, a radio access network (radio access network, RAN) node that enables a terminal to access the wireless network. Currently, some examples of the RAN node are a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), or a wireless fidelity (wireless fidelity, Wi-Fi) access point (access point, AP). In a network structure, the network device may include a centralized unit (centralized unit, CU) node, or a distributed unit (distributed unit, DU) node, or a RAN device including a CU node and a DU node. It may be understood that the communication system shown in FIG. 1 is described by using an example in which there are two RAN devices 110, one CN device 120, and one terminal device 130. Optionally, the communication system shown in FIG. 1 may further include another quantity of RAN devices 110, and may further include another quantity of terminal devices and the like within coverage of each RAN device 110. This is not limited.

Figure 2:
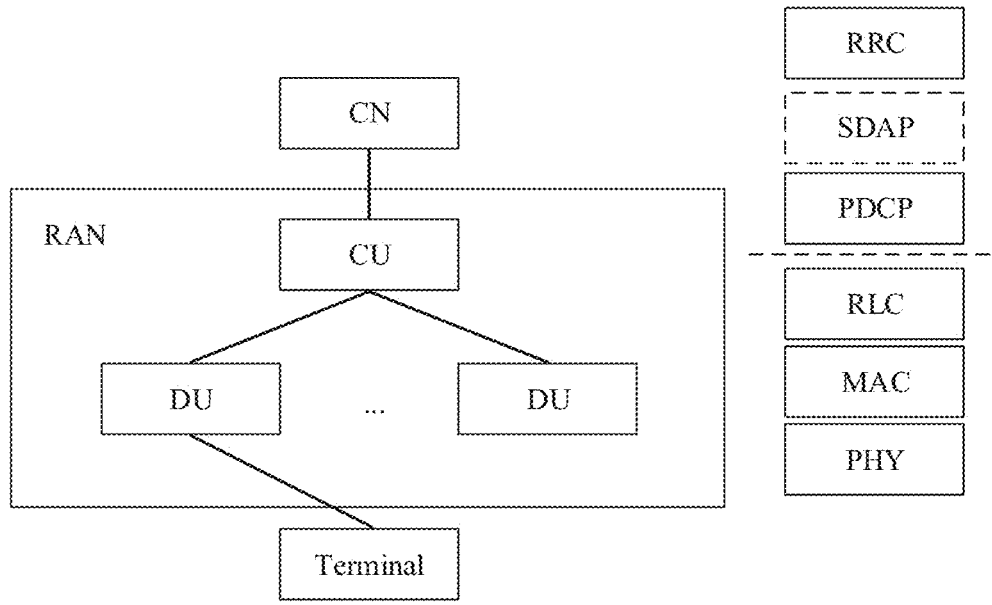
FIG. 2 is a schematic diagram of a network architecture according to an embodiment of this application.

FIG. 2 is a schematic diagram of a network architecture to which embodiments of this application are applicable. As shown in FIG. 2, the network architecture includes a CN device and a RAN device. The RAN device includes a baseband apparatus and a radio frequency apparatus. The baseband apparatus may be implemented by using one node, or may be implemented by using a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in a long term evolution (long term evolution, LTE) communication system, a RAN device (for example, an evolved node eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN device and a terminal device complies with a specified protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data application protocol (service data adaptation protocol, SDAP) layer may further be included above the PDCP layer.

The functions of these protocol layers may be implemented by using one node, or may be implemented by using a plurality of nodes. For example, in an evolved structure, the RAN device may include a centralized (centralized unit, CU) and a distributed unit (distributed unit, DU), and a plurality of DUs may be controlled by one CU in a centralized manner. As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

It should be understood that division based on the foregoing protocol layer is merely an example, and division may alternatively be performed based on another protocol layer. For example, division is performed based on the RLC layer. In this case, functions of the RLC layer and a layer above the RLC layer are set in the CU, and a function of a protocol layer below the RLC layer is set in the DU. Alternatively, division is performed at a protocol layer. For example, a part of functions of the RLC layer and a function of a protocol layer above the RLC layer are set in the CU, and a remaining function of the RLC layer and a function of a protocol layer below the RLC layer are set in the DU. In addition, division may alternatively be performed in another manner. For example, the division is performed based on a delay. A function whose processing time needs to satisfy a delay requirement is set in the DU, and a function whose processing time does not need to satisfy the delay requirement is set in the CU.

In addition, the radio frequency apparatus may not be disposed in the DU but is disposed remotely from the DU, or may be integrated into the DU, or a part of the radio frequency apparatus is disposed remotely from the DU and a remaining part is integrated into the DU. This is not limited herein.

Figure 3:
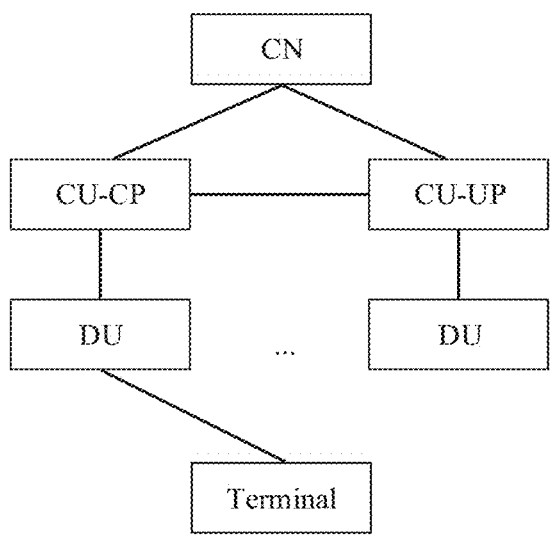
FIG. 3 is another schematic diagram of a network architecture according to an embodiment of this application.

FIG. 3 is a schematic diagram of another network architecture according to an embodiment of this application. Compared with the architecture shown in FIG. 2, a control plane (control plane. CP) and a user plane (user plane, UP) of a CU may further be separated, and are implemented by different entities, which are respectively a control plane CU entity (CU-CP entity) and a user plane CU entity (CU-UP entity).

In the foregoing network architecture, signaling generated by the CU may be sent to a terminal through a DU, or signaling generated by a terminal may be sent to the CU through a DU. The DU may transparently transmit the signaling to the terminal or the CU by directly encapsulating the signaling at a protocol layer without parsing the signaling. In the following embodiments, if transmission of signaling between the DU and the terminal is described, sending or receiving the signaling by the DU is applicable to the foregoing scenario. For example, signaling at an RRC layer or a PDCP layer is finally processed as signaling at a PHY layer and sent to the terminal, or signaling at an RRC layer or a PDCP layer is converted from received signaling at a PHY layer. In this architecture, the signaling at the RRC layer or the PDCP layer may also be considered as being sent by the DU, or sent by the DU and a radio frequency apparatus.

In the foregoing embodiment, the CU is classified into a network device on a RAN side. In addition, the CU may be alternatively classified into a network device on a CN side. This is not limited herein.

An apparatus in the following embodiments of this application may be located in a terminal or a network device based on functions implemented by the apparatus. When the foregoing CU-DU structure is used, the network device may be a CU node, a DU node, or a RAN device including a CU node and a DU node.

Figures 4, 5:
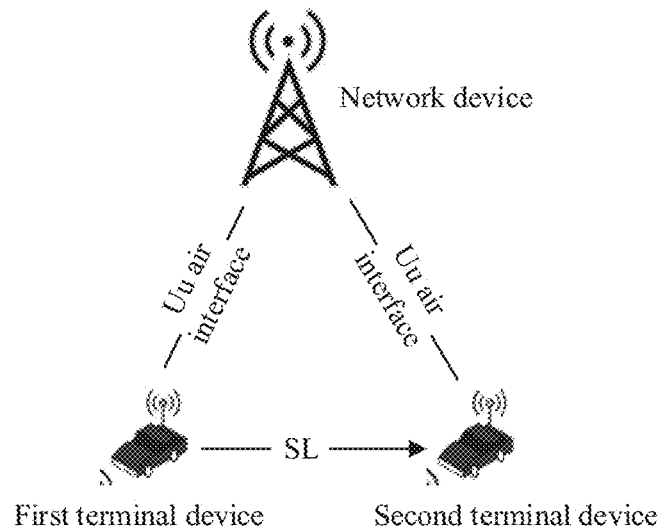
FIG. 4 is a schematic diagram of an application scenario according to an embodiment of this application.
FIG. 5 is a flowchart of a communication method according to an embodiment of this application.

FIG. 4 is a schematic diagram of an application scenario according to an embodiment of this application. A communication system in the application scenario includes a first terminal device, a second terminal device, and a network device. The first terminal device or the second terminal device may be the terminal device 130 in FIG. 1, the network device may be the RAN device 110 in FIG. 1, and the network device 110 may use the network architecture shown in FIG. 2 or FIG. 3.

Refer to FIG. 4. The first terminal device and the second terminal device may communicate with each other by using a sidelink (sidelink, SL). The first terminal device and the second terminal device each may communicate with the network device through a Uu air interface. For ease of understanding, the following describes the SL and the Uu air interface.

The SL is used for communication between terminal devices, and may include a physical sidelink shared channel (physical sidelink shared channel, PSSCH) and a physical sidelink control channel (physical sidelink control channel, PSCCH). The PSSCH is used to carry sidelink data (SL data), the PSCCH is used to carry sidelink control information (sidelink control information, SCI), and the SCI may include a sidelink scheduling assignment (sidelink scheduling assignment, SL SA). The SL SA is information related to data scheduling. For example, the SL SA is used to carry information such as resource allocation and/or a modulation and coding scheme (modulation and coding scheme, MCS) of the PSSCH.

The Uu air interface is used for communication between a terminal device and a network device, and the Uu air interface may also be referred to as Uu for short. During Uu air interface communication, a channel on which the network device sends information to the terminal device is referred to as a downlink (downlink, DL) channel, and a channel on which the terminal device sends information to the network device is referred to as an uplink (uplink, UL) channel. Uu air interface communication may include uplink transmission and downlink transmission. The uplink transmission means that the terminal device sends data to the network device, and the downlink transmission means that the network device sends data to the terminal device. The data may be data in a broad sense, for example, may be user data, or may be system information, broadcast information, or other information. This is not limited.

It is set that the first terminal device and the second terminal device work in a frequency range 1 of an unlicensed spectrum, the first terminal device is an initiator of SL communication, and the second terminal device is a receiver of the SL communication. A working process is as follows: The first terminal device monitors the frequency range 1, and after determining that the frequency range 1 is not occupied by another terminal device, performs SL communication with the second terminal device in the frequency range 1. The foregoing process may also be referred to as listen before talk (listen before talk, LBT), Optionally, in the following descriptions, the unlicensed spectrum may also be referred to as a shared spectrum. The frequency range may include information such as a center frequency and bandwidth, may include a start (or end) frequency and bandwidth, or may include a start frequency and an end frequency. This is not limited, provided that the frequency range can be determined based on provided information.

It can be learned from the foregoing analysis that after successfully performing LBT, the first terminal device occupies the frequency range 1 to perform SL communication with the second terminal device. However, when the first terminal device successfully performs LBT, the first terminal device can determine only that no other terminal device near the first terminal device occupies the frequency range 1 for communication, in other words, that there is no hidden node near the first terminal device. However, whether there is another terminal device that is near the second terminal device and that occupies the frequency range 1 for communication, in other words, whether there is a hidden node near the second terminal device, cannot be determined.

Based on the foregoing descriptions, embodiments of this application provide a method for determining a hidden node and an apparatus. Based on the method and the apparatus, whether there is a hidden node near the second terminal device can be determined. A principle of the method is as follows: The first terminal device performs received signal strength indication (received signal strength indication, RSSI) measurement in a first frequency range, to obtain a first measurement result. The second terminal device performs RSSI measurement in the first frequency range, to obtain a second measurement result. Whether there is a hidden node near the second terminal device may be determined based on the first measurement result and the second measurement result. For example, if the first measurement result is far less than the second measurement result, it may be determined that there is a hidden node near the second terminal device. If the first measurement result is greater than the second measurement result, it is determined that there is no hidden node near the second terminal device.

It may be understood that the method for determining a hidden node and the apparatus that are provided in embodiments of this application may be used in a 4th generation (4th generation, 4G) communication system, for example, a long term evolution (long term evolution, LTE) system; a 5th generation (5th generation, 5G) communication system, for example, a new radio (new radio, NR) system; or various future evolved communication systems, for example, the Internet of Things, the Internet of Vehicles, or a 6th generation (6th generation, 6G) communication system. This is not limited. Further, in the following descriptions, terms such as "first" and "second", for example, the "first terminal device", the "second terminal device", the "first measurement result", and the "second measurement result", are merely used for differentiation and description, and cannot be understood as an indication or implication of an order or the like.

As shown in FIG. 5, a procedure of a method for determining a hidden node is provided. The procedure is performed by a communication apparatus. The communication apparatus may be a network device, a chip in the network device, a terminal device, or a chip in the terminal device. The network device may be specifically the RAN 110 in FIG. 1, the terminal device may be the terminal device 130 in FIG. 1, and the network device may use the network architecture shown in FIG. 2 or FIG. 3. The procedure includes the following steps.

S501: The communication apparatus obtains a first measurement result of a first terminal device and a second measurement result of a second terminal device.

The first terminal device may perform RSSI measurement based on first RSSI measurement configuration information, to obtain the first measurement result. The first measurement result may include a first RSSI and/or a first channel occupancy. Further, the first terminal device may generate a first measurement report based on the first measurement result, where the first measurement report may carry the first measurement result. Similarly, the second terminal device may perform RSSI measurement based on second RSSI measurement configuration information, to obtain the second measurement result. The second measurement result may include a second RSSI and/or a second channel occupancy. Further, the second terminal device may generate a second measurement report based on the second measurement result, where the second measurement report carries the second measurement result.

Optionally, the first RSSI measurement configuration information and the second RSSI measurement configuration information may be generated by the network device. The network device sends the first RSSI measurement configuration information to the first terminal device, and sends the second RSSI measurement configuration information to the second terminal device. Alternatively, the first RSSI measurement configuration information and the second RSSI measurement configuration information may be generated by the first terminal device. The first terminal device sends the second RSSI measurement configuration information to the second terminal device by using an SL, or sends the second RSSI measurement configuration information to the second terminal device by using the network device. For example, the first terminal device may send the second RSSI measurement configuration information to the network device, and then the network device forwards the second RSSI measurement configuration information to the second terminal device. Alternatively, the first RSSI measurement configuration information and the second RSSI measurement configuration information may be generated by the second terminal device. The second terminal device sends the first RSSI measurement configuration information to the first terminal device by using an SL, or sends the first RSSI measurement configuration information to the first terminal device by using the network device. For example, the second terminal device sends the first RSSI measurement configuration information to the network device, and then the network device forwards the first RSSI measurement configuration information to the first terminal device.

The first RSSI measurement configuration information may include at least one of information about a first frequency range (or information about first bandwidth), a first measurement window, or a first reporting periodicity. Similarly, the second RSSI measurement configuration information may include at least one of the information about the first frequency range (or the information about the first bandwidth), a second measurement window, or a second reporting periodicity. One reporting periodicity may include one or more measurement windows. In one measurement window, the first terminal device or the second terminal device performs RSSI sampling at least once. The following first RSSI may be an average value of one or more RSSIs sampled or obtained by the first terminal device through measurement in a reporting periodicity. Similarly, the following second RSSI may be an average value of one or more RSSIs sampled or obtained by the second terminal device through measurement in a reporting periodicity. In the foregoing configuration information, the first measurement window and the second measurement window may be the same or different, and the first measurement window and the second measurement window appear periodically. The first reporting periodicity and the second reporting periodicity may be the same or different. The following first RSSI may be an average value of one or more RSSIs obtained by the first terminal device through measurement in the first measurement window in the first reporting periodicity. Similarly, the following second RSSI may be an average value of one or more RSSIs obtained by the second terminal device through measurement in the second measurement window in the second reporting periodicity. When the first measurement window is the same as the second measurement window, and the first reporting periodicity is the same as the second reporting periodicity, consistency between the RSSI obtained by the first terminal device through measurement and the RSSI obtained by the second terminal device through measurement is high, and a result of the RSSI obtained through measurement is more accurate.

The first frequency range may also be referred to as the first bandwidth, and the information about the first frequency range or the information about the first bandwidth is used to determine the first frequency range or the first bandwidth. For example, the information about the first frequency range may include information about a center frequency or information about a frequency domain width (which is also referred to as bandwidth) of the frequency range, may include information about a start (or end) frequency and information about bandwidth, or may include a start frequency and an end frequency. This is not limited, provided that the frequency range can be determined based on provided information.

A part of the information about the first frequency range (or the information about the first bandwidth), the first measurement window, and the first reporting periodicity may be preset, and therefore does not need to be configured by using the first RSSI measurement configuration information or the second RSSI measurement configuration information. For example, the first reporting periodicity may be preset, and the first RSSI measurement configuration information or the second RSSI measurement configuration information may be used to configure only the information about the first frequency range (or the information about the first bandwidth) and the first measurement window. Alternatively, the first measurement window may be preset, and the first RSSI measurement configuration information or the second RSSI measurement configuration information may be used to configure only the information about the first frequency range (or the information about the first bandwidth) and the first reporting periodicity. Alternatively, two of the information about the first frequency range, the reporting periodicity, and the first measurement window are preset. Alternatively, the first measurement window may not be configured or preset, but the entire first frequency range is measured by default S502: The communication apparatus determines, based on the first measurement result and the second measurement result, that there is a hidden node for the second terminal device, or that there is a hidden node near the second terminal device, where the hidden node may also be referred to as a hidden terminal.

In an example, the first measurement result includes the first RSSI, the first RSSI is an average value of one or more RSSIs obtained by the first terminal device through measurement in the first frequency range, the second measurement result includes the second RSSI, and the second RSSI is an average value of one or more RSSIs obtained by the second terminal device through measurement in the first frequency range. A specific implementation of S502 is as follows: When a difference between the second RSSI and the first RSSI is greater than or equal to a first threshold, the communication apparatus determines that there is the hidden node near the second terminal device. Otherwise, the communication apparatus determines that there is no hidden node near the second terminal device.

In an example, the first measurement result includes a first channel occupancy (channel occupancy), and the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range. For example, when the first terminal device performs sampling for N times (where N is greater than 0) in the first frequency range, and RSSIs obtained through M times of sampling (where M is greater than 0 and less than N) are greater than the threshold, the first channel occupancy is obtained as M/N. A second channel occupancy is similar to this, and details are not described again. The second measurement result includes the second channel occupancy, and the second channel occupancy is a ratio of a quantity of RSSIs that are obtained by the second terminal device through measurement in the first frequency range and that are greater than a threshold to a total quantity of RSSIs obtained by the second terminal device through measurement in the first frequency range. A specific implementation of S502 is as follows: When a difference between the second channel occupancy and the first channel occupancy is greater than or equal to a second threshold, the communication apparatus determines that there is the hidden node near the second terminal device. Otherwise, the communication apparatus determines that there is no hidden node near the second terminal device. Optionally, the communication apparatus may further determine, based on the first channel occupancy and the second channel occupancy, a level of impact of the hidden node on sidelink communication between the first terminal device and the second terminal device. For example, if the difference between the first channel occupancy and the second channel occupancy is greater than or equal to a third threshold, the communication apparatus may determine that the level (or a degree) of the impact of the hidden node on a sidelink between the first terminal device and the second terminal device is high, that is, the level is a first level. Otherwise, the communication apparatus may determine that the level (or the degree) of the impact of the hidden node on the sidelink between the first terminal device and the second terminal device is low, that is, the level is a second level. The first level is higher than the second level. Optionally, more thresholds may be set to correspond to different levels, so as to implement finer-grained level division, and manage the hidden node more flexibly. Unicast communication, multicast communication, or the like may be performed between the first terminal device and the second terminal device. This is not limited.

"First", "second", and the like in the first threshold, the second threshold, and the third threshold are merely intended to facilitate differentiation in a description process, and are not intended to limit a difference between or a sequence of these thresholds, and do not constitute a limitation on a subsequent threshold. In respective solutions, descriptions of "first", "second", and the like may be removed. Other expressions with ordinal numbers, for example, the first measurement report and the second measurement report, are similar to this.

Optionally, in addition to the first RSSI and/or the first channel occupancy, the first measurement result of the first terminal device may further include one or more of the following information: identifier information (for example, a sidelink carrier identifier (sidelink carrier ID)) of the first bandwidth, identifier information of the first terminal device, identifier information of the sidelink, identifier information of the second terminal device, and the like. The bandwidth is also referred to as a frequency range, and may include, for example, a carrier or a bandwidth part (bandwidth part, BWP). The identifier information of the first terminal device may be a destination identifier or the like. This is not limited.

Similarly, optionally, in addition to the second RSSI and/or the second channel occupancy, the second measurement result of the second terminal device may further include one or more of the following information: the identifier information (for example, the sidelink carrier identifier) of the first bandwidth, the identifier information of the second terminal device, the identifier information of the sidelink, the identifier information of the first terminal device, and the like. The identifier information of the second terminal device may be a destination identifier or the like. This is not limited.

In the foregoing or following embodiments of this application, when there is a wireless connection between a terminal device and a network device, an identifier of the terminal device may be an identifier, for example, a cell radio network temporary identifier (cell radio network temporary identifier, C-RNTI), allocated by the network device to the terminal device, or may be an identifier, for example, a source identifier (source ID) or a destination identifier (destination ID) of the terminal device, of sidelink communication. The destination identifier is, for example, a destination layer-2 identifier (destination layer-2 ID), and identifies a target (target) of data in the sidelink communication or V2X sidelink communication. The source identifier is, for example, a source layer-2 identifier (source layer-2 ID), and identifies a sender (sender) of the data in the sidelink communication or the V2X sidelink communication.

In this embodiment of this application, the first terminal device may serve as an initiator of the SL communication, and the second terminal device may serve as a receiver of the SL communication. The first terminal device and the second terminal device may work on a licensed spectrum or an unlicensed spectrum. This is not limited. According to the method provided in FIG. 5, whether there is the hidden node near the second terminal device can be determined. When there is the hidden node for the second terminal device, the network device may reallocate, to the first terminal device, a frequency range used for sidelink communication, so that the sidelink communication between the first terminal device and the second terminal device is not affected by the hidden node. Therefore, communication quality is ensured.

Example 1

The communication apparatus in the procedure shown in FIG. 5 is used for the network device. In other words, the communication apparatus in the procedure shown in FIG. 5 is the network device. In the following embodiment, an example in which the communication apparatus is the network device is used for description.

The first terminal device performs RSSI measurement based on the first RSSI measurement configuration information, and generates the first measurement report based on a result of the RSSI measurement, where the first measurement report carries the first measurement result. Similarly, the second terminal device performs RSSI measurement based on the second RSSI measurement configuration information, and generates the second measurement report based on a result of the RSSI measurement, where the second measurement report carries the second measurement result.

Figure 6:
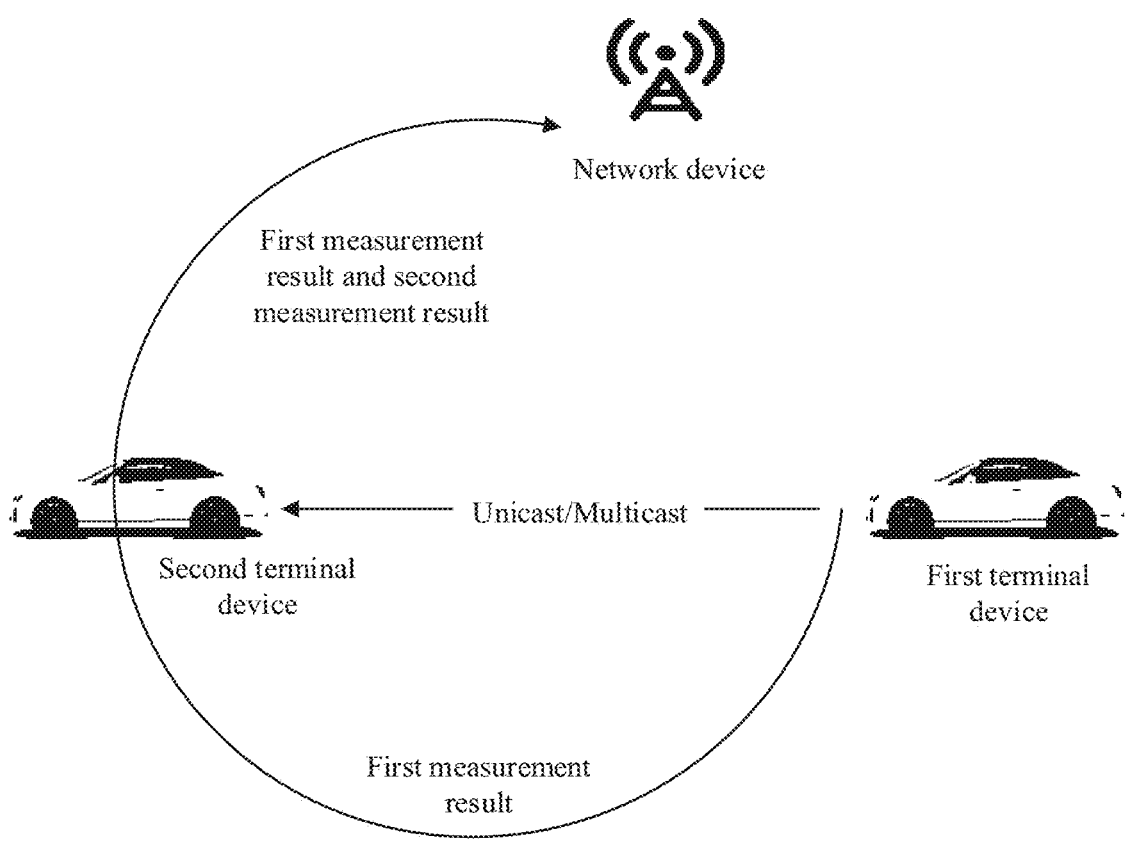
FIG. 6 is a schematic diagram of an application scenario according to an embodiment of this application.

In a feasible manner, as shown in FIG. 6, the first terminal device sends the first measurement report to the second terminal device, where the first measurement report may be transmitted by using a sidelink media access control control element (sidelink media access control control element, MAC CE) or sidelink radio resource control (sidelink radio resource control, RRC) signaling. The second terminal device generates a third measurement report based on the first measurement result carried in the first measurement report and the second measurement result carried in the second measurement report, where the third measurement report carries the first measurement result and the second measurement result. The second measurement report is only for ease of description, and may be a measurement result instead of being presented in a form of a to-be-reported measurement report. The second terminal device may generate the third measurement report based on the first measurement result carried in the first measurement report and the second measurement result obtained through measurement by the second terminal device. In this case, the second measurement report may be understood as the second measurement result. The following examples are similar to this. In addition, when the first terminal device generates a measurement report including the first measurement result and the second measurement result, descriptions of the first measurement report are similar to this, and details are not described again. The second terminal device sends the third measurement report to the network device. Correspondingly, the network device receives the third measurement report from the second terminal device. To be specific, a specific implementation of S501 may be as follows: The network device receives the third measurement report from the second terminal device, where the third measurement report may be transmitted by using a Uu MAC CE or Uu RRC signaling. Then, the network device may obtain the first measurement result and the second measurement result from the third measurement report. In this manner, the network device needs to learn that there is a correspondence between the first measurement result in the first measurement report and the second measurement result in the second measurement report. Therefore, the third measurement report may include the identifier information of the sidelink communication between the first terminal device and the second terminal device, or the identifier information of the first terminal device. In other words, in addition to the first measurement result and the second measurement result, the third measurement report may further include one or more of the following information: the identifier information of the first frequency range, the identifier information of the first terminal device, the identifier information of the second terminal device, and the identifier information of the sidelink that is between the first terminal device and the second terminal device and that is used for sidelink communication. Optionally, if the network device uses a CU-DU architecture, the second terminal device may send the third measurement report to a DU of the network device. The DU of the network device forwards the third measurement report to a CU.

Still refer to FIG. 6. In another feasible manner, the first terminal device and the second terminal device respectively send the first measurement report and the second measurement report to the network device, where the first measurement report and the second measurement report may be transmitted by using a Uu MAC CE or Uu RRC signaling. Correspondingly, the network device separately receives the first measurement report from the first terminal device and the second measurement report from the second terminal device. To be specific, a specific implementation of S501 may be as follows: The network device receives the second measurement report from the second terminal device, and receives the first measurement report from the first terminal device. Then, the network device may obtain the first measurement result from the first measurement report, and obtain the second measurement result from the second measurement report.

After obtaining the first measurement result and the second measurement result, the network device may determine, in the manner recorded in S502, whether there is the hidden node near the second terminal device, to help subsequently allocate a sidelink (sidelink) resource to the first terminal device. For example, according to the foregoing method, if it is detected that there is the hidden node near a second terminal device side, the network device may allocate a frequency range other than the frequency range 1 to a first terminal device side, where the frequency range is used for sidelink communication with the second terminal device. If it is detected through measurement that there is no hidden node near the second terminal device side, the network device may continue to allocate the frequency range 1 to the first terminal device, where the frequency range 1 is used for sidelink communication with the second terminal device. Therefore, quality of the sidelink communication between the first terminal device and the second terminal device can be ensured.

For example, the first measurement result of the first terminal device in the first frequency range includes the first RSSI, and the second measurement result of the second terminal device in the first frequency range includes the second RSSI. If the first RSSI is far less than the second RSSI, it may be determined that there is the hidden node near the second terminal device. Otherwise, it is determined that there is no hidden node near the second terminal device.

Optionally, the first measurement result may further include the first channel occupancy, and the second measurement result may further include the second channel occupancy. If the first channel occupancy is far less than the second channel occupancy, it indicates that the hidden node near the second terminal device has great impact on the sidelink between the first terminal device and the second terminal device.

Example 2

The procedure shown in FIG. 5 is applied to the second terminal device. In other words, the communication apparatus in the procedure shown in FIG. 5 is the second terminal device. In the following embodiment, an example in which the communication apparatus is the second terminal device is used for description.

Same as the descriptions in Example 1, the first terminal device performs RSSI measurement, to obtain the first measurement report, where the first measurement report carries the first measurement result. The second terminal device performs RSSI measurement, to obtain the second measurement report, where the second measurement report carries the second measurement result. In this example, the first terminal device may send the first measurement report to the second terminal device. Correspondingly, the second terminal device receives the first measurement report from the first terminal device. A specific implementation of S501 may be as follows: The second terminal device receives the first measurement report from the first terminal device, where the first measurement report carries the first measurement result. The second terminal device obtains the second measurement result through the RSSI measurement. Then, the second terminal device may determine, in the manner recorded in S502, whether there is the hidden node near the second terminal device. For example, the first measurement result includes the first RSSI obtained by the first terminal device through measurement in the first frequency range, and the second measurement result includes the second RSSI obtained by the second terminal device through measurement in the first frequency range. If the first RSSI is far less than the second RSSI, it may be determined that there is the hidden node near the second terminal device. Otherwise, it is determined that there is no hidden node near the second terminal device. Optionally, the first measurement result may further include the first channel occupancy obtained by the first terminal device through measurement in the first frequency range, and the second measurement result may further include the second channel occupancy obtained by the second terminal device through measurement in the first frequency range. The second terminal device may further determine, based on the first channel occupancy and the second channel occupancy, the level of the impact of the hidden node on the sidelink between the first terminal device and the second terminal device. For example, a larger difference between the first channel occupancy and the second channel occupancy indicates greater impact of the hidden node on the sidelink between the first terminal device and the second terminal device, and indicates a higher level of the impact. On the contrary, a smaller difference between the first channel occupancy and the second channel occupancy indicates less impact of the hidden node on the sidelink between the first terminal device and the second terminal device, and indicates a lower level of the impact.

In this example, after the second terminal device determines the hidden node on a second terminal device side and the level of the impact of the hidden node on the sidelink between the first terminal device and the second terminal device, the second terminal device may further send first indication information to the network device, so that the network device learns of a status of the current hidden node, to subsequently allocate a sidelink resource to the first terminal device, thereby ensuring quality of sidelink communication between the first terminal device and the second terminal device. The first indication information may include one or more of the following information. The first indication information may include indication information used to indicate whether there is the hidden node, in other words, indication information indicating whether there is the hidden node. For example, 1 may be used to indicate that there is the hidden node, and 0 may be used to indicate that there is no hidden node. Alternatively, reporting may be performed only when there is the hidden node, and the indication information is not reported when there is no hidden node. In this case, the indication information is used to indicate that there is the hidden node. The first indication information may include identifier information of the first frequency range, in other words, identifier information of the bandwidth; the identifier information of the first terminal device; the identifier information of the second terminal device, used to notify the network device of a specific sidelink for the first indication information; indication information indicating the level of the impact of the hidden node on the sidelink communication between the first terminal device and the second terminal device, in other words, hidden level (or degree) information; and identifier information of the sidelink that is between the first terminal device and the second terminal device and that is used for sidelink communication, in other words, the identifier information of the sidelink, used to notify the network device of a specific sidelink indicated by the first indication information.

Correspondingly, after receiving the first indication information, the network device may allocate a sidelink resource to the first terminal device based on the first indication information. The sidelink resource is used by the first terminal device and the second terminal device for sidelink communication. For example, when there is no hidden node near the second terminal device, the first indication information may indicate the first terminal device and the second terminal device to continue communication in the frequency range 1. When there is the hidden node near the second terminal device, the network device may reallocate a frequency range 2 to the first terminal device for sidelink communication.

Example 3

The communication apparatus in the procedure shown in FIG. 5 is used for the network device. In other words, the communication apparatus in the procedure shown in FIG. 5 is the network device. An example in which the communication apparatus is the network device is used for description below.

Same as the descriptions in Example 1, the first terminal device performs RSSI measurement, to obtain the first measurement report, where the first measurement report includes the first measurement result. The second terminal device performs RSSI measurement, to obtain the second measurement report, where the second measurement report includes the second measurement result.

Figure 7:
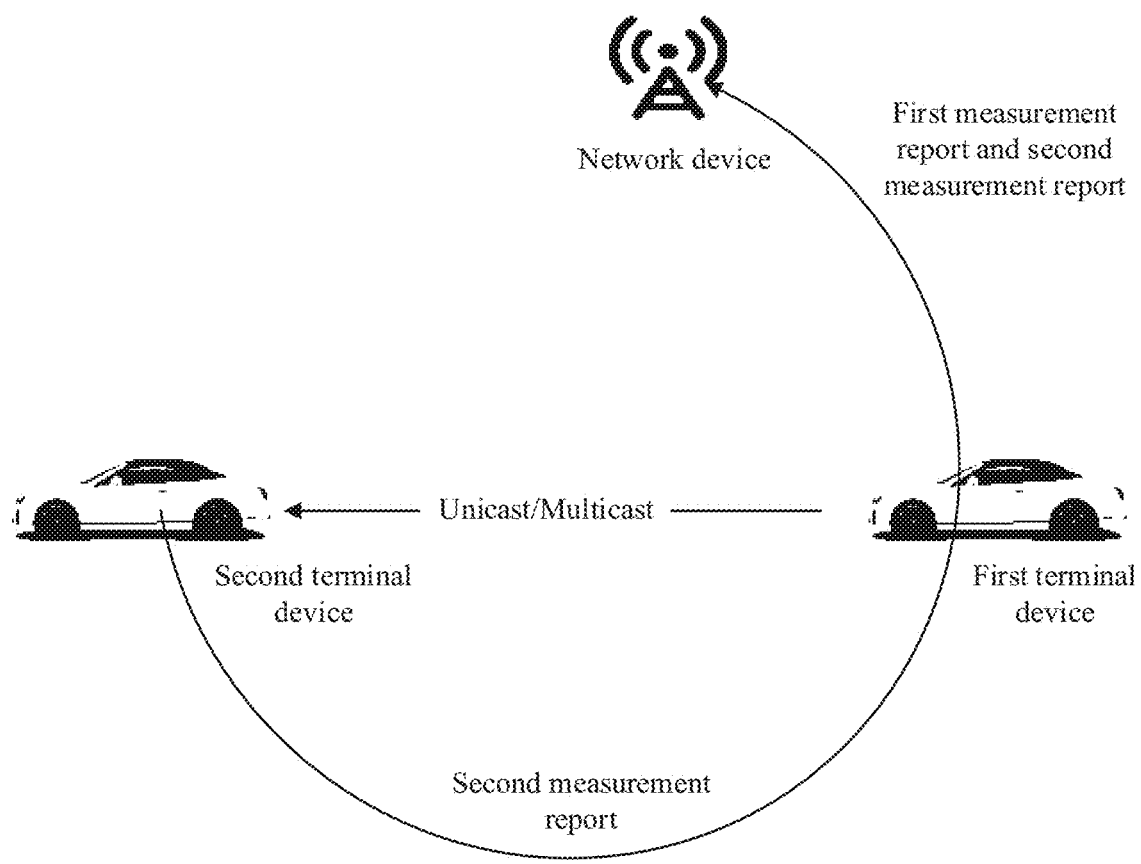
FIG. 7 is another schematic diagram of an application scenario according to an embodiment of this application.

In a possible manner, as shown in FIG. 7, the second terminal device sends the second measurement report to the first terminal device. Correspondingly, the first terminal device receives the second measurement report from the second terminal device. The first terminal device sends the second measurement report and the first measurement report to the network device. Correspondingly, the network device receives the first measurement report and the second measurement report from the first terminal device. To be specific, a specific implementation of S501 may be as follows: The network device receives the first measurement report and the second measurement report from the first terminal device.

Still refer to FIG. 7. In another possible manner, the second terminal device sends the second measurement report to the first terminal device. Correspondingly, the first terminal device receives the second measurement report from the second terminal device. The first terminal device obtains the second measurement result from the second measurement report, and obtains the first measurement result from the first measurement report. The first terminal device generates a fourth measurement report based on the first measurement result and the second measurement result. In other words, the fourth measurement report includes the first measurement result and the second measurement result. The first terminal device sends the fourth measurement report to the network device. Correspondingly, the network device receives the fourth measurement report from the first terminal device. To be specific, a specific implementation of S501 may be as follows: The network device receives the fourth measurement report from the first terminal device. In this example, the network device needs to determine a correspondence between the first measurement result and the second measurement result. Therefore, the fourth measurement report may include a sidelink identifier or an identifier of the second terminal device. In other words, in addition to the first measurement result and the second measurement result, the fourth measurement report may further include one or more of the following information: identifier information of the first frequency range, the identifier information of the first terminal device, the identifier information of the second terminal device, and identifier information of the sidelink that is between the first terminal device and the second terminal device and that is used for sidelink communication. Optionally, if the network device uses a CU-DU architecture, the first terminal device may send the fourth measurement report to a DU of the network device, and then the DU of the network device forwards the fourth measurement report to a CU of the network device.

Then, the network device may determine, in the manner recorded in S502, whether there is the hidden node near the second terminal device. Optionally, the network device may further determine the level of the impact of the hidden node on the sidelink communication between the first terminal device and the second terminal device. For a specific process, refer to the record in Example 1, and details are not described herein again.

Example 4

The communication apparatus in the procedure shown in FIG. 5 is used for the first terminal device. In other words, the communication apparatus in the procedure shown in FIG. 5 is the first terminal device. An example in which the communication apparatus is the first terminal device is used for description below.

Same as the descriptions in Example 1, the first terminal device obtains the first measurement report based on a result of the RSSI measurement, where the first measurement report includes the first measurement result. The second terminal device obtains the second measurement report based on a result of the RSSI measurement, where the second measurement report includes the second measurement result. The second terminal device sends the second measurement report to the first terminal device. Correspondingly, the first terminal device receives the second measurement report from the second terminal device. To be specific, a specific manner of S501 may be as follows: The first terminal device receives the second measurement report from the second terminal device; and the first terminal device obtains the first measurement result through the RSSI measurement.

After obtaining the first measurement result in the first measurement report and the second measurement result in the second measurement report, the first terminal device may determine, in the manner recorded in S502, whether there is the hidden node near the second terminal device. For example, the first terminal device may determine, based on the first RSSI in the first measurement result and the second RSSI in the second measurement result, whether there is the hidden node near the second terminal device. For example, if the second RSSI is far greater than the first RSSI, the first terminal device may determine that there is the hidden node near the second terminal device. Otherwise, the first terminal device may determine that there is no hidden node near the second terminal device. Optionally, the first terminal device may further determine, based on the first channel occupancy in the first measurement result and the second channel occupancy in the second measurement result, the level of the impact of the hidden node on the sidelink between the first terminal device and the second terminal device. For example, if the difference between the second channel occupancy and the first channel occupancy is large, it may be determined that the impact of the hidden node on the sidelink between the first terminal device and the second terminal device is great, and the level of the impact is high. Otherwise, if the difference between the second channel occupancy and the first channel occupancy is small, it may be determined that the impact of the hidden node on the sidelink between the first terminal device and the second terminal device is little, and the level of the impact is low.

Optionally, the first terminal device may further send second indication information to the network device. Correspondingly, the network device receives the second indication information from the first terminal device. The second indication information may include one or more of the following information:

indication information used to indicate whether there is the hidden node, in other words, indication information indicating whether there is the hidden node; identifier information of the first frequency range, in other words, identifier information of the bandwidth the identifier information of the first terminal device; the identifier information of the second terminal device; indication information indicating the level of the impact of the hidden node on the sidelink communication between the first terminal device and the second terminal device; and identifier information of the sidelink that is between the first terminal device and the second terminal device and that is used for sidelink communication.

Example 5

The communication apparatus in the procedure shown in FIG. 5 is used for a network device. In other words, the communication apparatus in the procedure shown in FIG. 5 is the network device. An example in which the communication apparatus is the network device is used for description below.

In a feasible embodiment, the first terminal device and the second terminal device may respectively obtain the first measurement report and the second measurement report in the manner in Example 1. Then, the first terminal device and the second terminal device respectively send the first measurement report and the second measurement report to the network device. Correspondingly, the network device separately receives the first measurement report from the first terminal device and the second measurement report from the second terminal device. To be specific, a specific implementation of S501 may be as follows: The network device receives the first measurement report from the first terminal device, and receives the second measurement report from the second terminal device. Then, the network device may determine, based on the first RSSI in the first measurement report and the second RSSI in the second measurement report, whether there is the hidden node near the second terminal device. Optionally, the network device may further determine, based on the first channel occupancy in the first measurement report and the second channel occupancy in the second measurement report, the level of the impact of the hidden node on the sidelink between the first terminal device and the second terminal device. In this example, the network device needs to obtain a correspondence between the first measurement report and the second measurement report. Therefore, the first measurement report may include the identifier information of the sidelink or the identifier information of the second terminal device. The second measurement report may include the identifier information of the sidelink or the identifier information of the first terminal device.

In the foregoing embodiments, whether there is a hidden node near one of two terminal devices that perform sidelink communication is determined based on measurement results of the two terminal devices. In another implementation, whether there is a hidden node for one terminal device may be determined based on only a measurement result of the terminal device. Descriptions are provided below with reference to the accompanying drawings.

Figure 8:
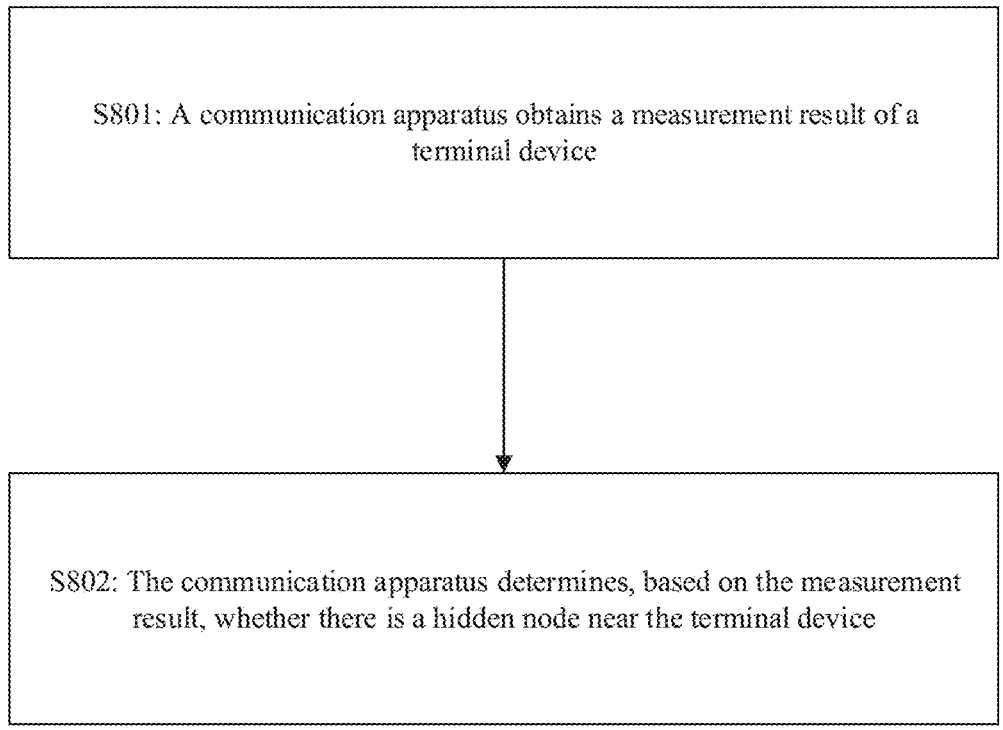
FIG. 8 is another flowchart of a communication method according to an embodiment of this application.

As shown in FIG. 8, a procedure of a method for determining a hidden node is provided. A communication apparatus in the method may be a network device, a chip in the network device, a terminal device, or a chip in the terminal device. The network device may be specifically the RAN 110 in FIG. 1, the terminal device may be the terminal device 130 in FIG. 1, and the network device may use the network architecture shown in FIG. 2 or FIG. 3. As shown in FIG. 8, the procedure includes the following steps.

S801: A communication apparatus obtains a measurement result of a terminal device.

S802: The communication apparatus determines, based on the measurement result, whether there is a hidden node near the terminal device.

The terminal device may correspond to the second terminal device in the foregoing embodiments, and correspondingly, the measurement result may be the second measurement result. To distinguish from the first terminal device, descriptions are provided below based on the second terminal device and the second measurement result.

For example, the second measurement result may include a second RSSI and/or a second channel occupancy. When a value of the second RSSI is greater than or equal to a first threshold, it may be determined that there is the hidden node near the second terminal device. Otherwise, it is determined that there is no hidden node near the second terminal device. In other words, when the value of the second RSSI is excessively large, it may be determined that there is the hidden node near the second terminal device. Otherwise, it is determined that there is no hidden node near the second terminal device. Alternatively, when a value of the second channel occupancy is greater than or equal to a second threshold, it may be determined that there is the hidden node near the second terminal device. Otherwise, it is determined that there is no hidden node near the second terminal device. In other words, when the value of the second channel occupancy is excessively large, it may be determined that there is the hidden node near the second terminal device. Otherwise, it may be determined that there is no hidden node near the second terminal device. Optionally, a level of impact of the hidden node on a sidelink between the first terminal device and the second terminal device may further be determined based on the value of the second channel occupancy. A larger value of the second channel occupancy indicates greater impact, and a smaller value of the second channel occupancy indicates smaller impact.

In an implementation, the communication apparatus in FIG. 8 is used for the network device, in other words, the communication apparatus is the network device. In the following embodiment, an example in which the communication apparatus is the network device is used for description. The second terminal device may send the second measurement result to the network device, and correspondingly, the network device receives the second measurement result from the second terminal device. To be specific, an implementation of S801 may be as follows: The network device receives the second measurement result of the second terminal device. Alternatively, the second terminal device sends the second measurement result to the first terminal device, and the first terminal device forwards the second measurement result to the network device. Correspondingly, the network device receives the second measurement result from the first terminal device. To be specific, an implementation of S801 may be as follows: The network device receives the second measurement result from the first terminal device.

In an implementation, the communication apparatus in FIG. 8 is used for the first terminal device, in other words, the communication apparatus is the first terminal device. In the following embodiment an example in which the communication apparatus is the first terminal device is used for description. The second terminal device sends the second measurement result to the first terminal device. Correspondingly, the first terminal device receives the second measurement result from the second terminal device. To be specific, an implementation of S801 may be as follows: The first terminal device receives the second measurement result from the second terminal device. Alternatively, the second terminal device sends the second measurement result to the network device, and the network device forwards the second measurement result to the first terminal device. Correspondingly, the first terminal device receives the second measurement result from the network device. To be specific, a specific implementation of S801 may be as follows: The first terminal device receives the second measurement result from the network device.

Optionally, the communication apparatus may further obtain a sidelink (sidelink) identifier corresponding to the second measurement result, where the sidelink identifier is used to enable the communication apparatus to identify that there is the hidden node near the second terminal device.

In a feasible implementation, the second measurement result of the second terminal device is sent by the second terminal device to the network device by using an SL, and the sidelink identifier may be an identifier of the first terminal device. For example, the identifier of the first terminal device may be a cell radio network temporary identifier (cell radio network temporary identifier, C-RNTI) of the first terminal device, a source identifier (source ID) of the first terminal device, or a destination identifier (destination ID) of the first terminal device. This is not limited.

In another feasible implementation, the second measurement result of the second terminal device is forwarded by the first terminal device to the network device. The sidelink identifier may be an identifier of the second terminal device, or identifier information that is of sidelink communication and that is allocated by the network device. For example, the identifier of the second terminal device may be a C-RNTI of the second terminal device, a source identifier of the second terminal device, or a destination identifier of the second terminal device. This is not limited.

In the foregoing embodiments provided in this application, the methods provided in embodiments of this application are described from a perspective of interaction among the network device, the first terminal device, and the second terminal device. To implement functions in the foregoing methods provided in embodiments of this application, each of the network device, the first terminal device, and the second terminal device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

An embodiment of this application further provides an apparatus configured to implement any one of the foregoing methods. For example, an apparatus is provided, including a unit (or means) configured to implement steps performed by the communication apparatus in any one of the foregoing methods. The communication apparatus may be the network device, the first terminal device, or the second terminal device.

The methods provided in embodiments of this application are described above in detail with reference to FIG. 4 to FIG. 8. Apparatuses provided in embodiments of this application are described below in detail with reference to FIG. 9 to FIG. 12. It should be understood that descriptions of apparatus embodiments correspond to the descriptions of the method embodiments. Therefore, for content that is not described in detail, refer to the descriptions in the foregoing method embodiments.

Figure 9:
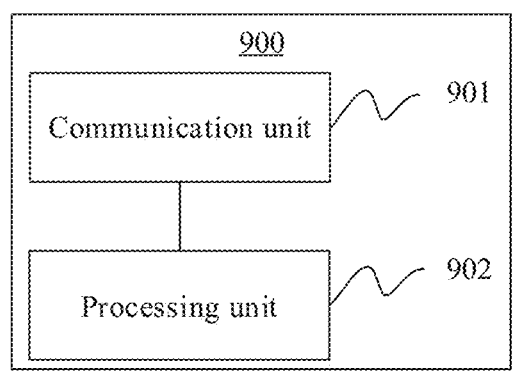
FIG. 9 is a schematic diagram of a structure of an apparatus according to an embodiment of this application.

FIG. 9 is a schematic block diagram of an apparatus 900 according to an embodiment of this application. The apparatus is configured to implement functions of the communication apparatus in the foregoing methods. For example, the apparatus may be a software module or a chip system. The chip system may include a chip, or may include a chip and another discrete device. The apparatus 900 includes a communication unit 901, and may further include a processing unit 902. The communication unit 901 may communicate with the outside. The processing unit 902 is configured to perform processing, for example, determining, based on the first measurement result and the second measurement result, that there is the hidden node for the second terminal device. The communication unit 901 may also be referred to as a communication interface, a transceiver unit, an input/output interface, or the like. For example, the communication unit 901 may include a sending unit and/or a receiving unit, and the like, respectively configured to perform a sending step or a receiving step in FIG. 4 to FIG. 8.

In an example, the apparatus 900 may implement the steps performed by the communication apparatus in the procedure shown in FIG. 5. The apparatus 900 may be the first terminal device, or a chip or a circuit disposed in the first terminal device. The communication 901 is configured to perform sending/receiving-related operations on a first terminal device side in the foregoing method embodiments, and the processing unit 902 is configured to perform processing-related operations on the first terminal device side in the foregoing method embodiments. Alternatively, the apparatus 900 may be the second terminal device, or a chip or a circuit disposed in the second terminal device. The communication unit 901 is configured to perform sending/receiving-related operations on a second terminal device side in the foregoing method embodiments, and the processing unit 902 is configured to perform processing-related operations on the second terminal device side in the foregoing method embodiments. Alternatively, the apparatus 900 may be the network device, or a chip or a circuit disposed on a network device side. The communication unit 901 is configured to perform sending/receiving-related operations on the network device side in the foregoing method embodiments, and the processing unit 902 is configured to perform processing-related operations on the network device side.

For example, the processing unit 902 is configured to obtain a first measurement result of a first terminal device and a second measurement result of a second terminal device, and determine, based on the first measurement result and the second measurement result, that there is a hidden node for the second terminal device. The first measurement result is determined by the first terminal device based on a received signal strength indication RSSI obtained through measurement in a first frequency range, the second measurement result is determined by the second terminal device based on an RSSI obtained through measurement in the first frequency range, and the first terminal device performs sidelink communication with the second terminal device in the first frequency range.

Optionally, the first measurement result includes a first RSSI, the first RSSI is an average value of one or more RSSIs obtained by the first terminal device through measurement in the first frequency range, the second measurement result includes a second RSSI, and the second RSSI is an average value of one or more RSSIs obtained by the second terminal device through measurement in the first frequency range. When determining, based on the first measurement result and the second measurement result, that there is the hidden node for the second terminal device, the processing unit 902 is specifically configured to: when a difference between the second RSSI and the first RSSI is greater than or equal to a first threshold, determine that there is the hidden node for the second terminal device.

Optionally, the first measurement result includes a first channel occupancy, the first channel occupancy is a ratio of a quantity of RSSIs that are obtained by the first terminal device through measurement the first frequency range and that are greater than a threshold to a total quantity of RSSIs obtained by the first terminal device through measurement in the first frequency range, the second measurement result includes a second channel occupancy, and the second chan- nel occupancy is a ratio of a quantity of RSSIs that are obtained by the second terminal device through measurement in the first frequency range and that are greater than a threshold to a total quantity of RSSIs obtained by the second terminal device through measurement in the first frequency range. When determining, based on the first measurement result and the second measurement result, that there is the hidden node for the second terminal device, the processing unit 902 is specifically configured to: when a difference between the second channel occupancy and the first channel occupancy is greater than or equal to a second threshold, determined, by the communication apparatus, that there is the hidden node for the second terminal device.

Optionally, the first measurement result includes the first channel occupancy, the first channel occupancy is the ratio of the quantity of RSSIs that are obtained by the first terminal device through measurement in the first frequency range and that are greater than the threshold to the total quantity of RSSIs obtained by the first terminal device through measurement in the first frequency range, the second measurement result includes the second channel occupancy, and the second channel occupancy is the ratio of the quantity of RSSIs that are obtained by the second terminal device through measurement in the first frequency range and that are greater than the threshold to the total quantity of RSSIs obtained by the second terminal device through measurement in the first frequency range. The processing unit 902 is further configured to determine, based on the first channel occupancy and the second channel occupancy, a level of impact of the hidden node on the sidelink communication between the first terminal device and the second terminal device.

Optionally, the communication apparatus is used for a network device. When obtaining the first measurement result of the first terminal device and the second measurement result of the second terminal device, the processing unit 902 is specifically configured to:
control the communication unit 901 to receive a first measurement report and a second measurement report from the second terminal device, where the first measurement report carries the first measurement result, and the second measurement report carries the second measurement result; or control the communication unit 901 to receive a third measurement report from the second terminal device, where the third measurement report carries the first measurement result and the second measurement result.

Optionally, the communication apparatus is used for the second terminal device. When obtaining the first measurement result of the first terminal device and the second measurement result of the second terminal device, the processing unit 902 is specifically configured to:
control the communication unit 901 to receive a first measurement report from the first terminal device, where the first measurement report carries the first measurement result; and obtain a second measurement result based on a result of the RSSI measurement, where the second measurement report carries the second measurement result.

Optionally, when determining the second measurement report based on the result of the RSSI measurement, the processing unit 902 is specifically configured to perform RSSI measurement in the first frequency range based on second RSSI measurement configuration information; and obtain the second measurement result through the RSSI measurement.

Optionally, the communication unit 901 is further configured to send first indication information to a network device, where
the first indication information includes one or more of the following information: indication information used to indicate whether there is the hidden node, identifier information of the first frequency range, identifier information of the first terminal device, identifier information of the second terminal device, indication information indicating the level of the impact of the hidden node on the sidelink communication between the first terminal device and the second terminal device, and identifier information of a sidelink that is between the first terminal device and the second terminal device and that is used for sidelink communication.

Optionally, the communication apparatus is used for a network device. When obtaining the first measurement result of the first terminal device and the second measurement result of the second terminal device, the processing unit 902 is specifically configured to:
control the communication unit 901 to receive a first measurement report and a second measurement report from the first terminal device, where the first measurement report carries the first measurement result, and the second measurement report carries the second measurement result; or control the communication unit 901 to receive a fourth measurement report from the first terminal device, where the fourth measurement report carries the first measurement result and the second measurement result.

Optionally, the communication apparatus is used for the first terminal device. When obtaining the first measurement result of the first terminal device and the second measurement result of the second terminal device, the processing unit 902 is specifically configured to:
control the communication unit 901 to receive a second measurement report from the second terminal device, where the second measurement report carries the second measurement result; and obtain a first measurement report based on a result of the RSSI measurement, where the first measurement report carries the first measurement result.

Optionally, when obtaining the first measurement report based on the result of the RSSI measurement, the processing unit 902 is specifically configured to perform RSSI measurement based on first RSSI measurement configuration information; and obtain the first measurement result through the RSSI measurement.

Optionally, the communication unit 901 is further configured to send second indication information to a network device, where
the second indication information includes one or more of the following information: indication information indicating whether there is the hidden node, identifier information of the first frequency range, identifier information of the first terminal device, identifier information of the second terminal device, indication information indicating the level of the impact of the hidden node on the sidelink communication between the first terminal device and the second terminal device, and identifier information of a sidelink that is between the first terminal device and the second terminal device and that is used for sidelink communication.

Optionally, the communication apparatus is used for a network device. When obtaining the first measurement result of the first terminal device and the second measurement result of the second terminal device, the processing unit 902 is specifically configured to:

control the communication unit 901 to receive a first measurement report from the first terminal device, where the first measurement report carries the first measurement result; and control the communication unit 901 to receive a second measurement report from the second terminal device, where the second measurement report carries the second measurement result.

Optionally, at least one of the first measurement report, the second measurement report, the third measurement report, or the fourth measurement report further includes one or more of the following:

the identifier information of the first frequency range, the identifier information of the first terminal device, the identifier information of the second terminal device, and the identifier information of the sidelink that is between the first terminal device and the second terminal device and that is used for sidelink communication.

In another example, the apparatus 900 may implement the steps performed by the communication apparatus in the procedure shown in FIG. 8. The apparatus 900 may be the first terminal device, or a chip or a circuit disposed in the first terminal device. The communication 901 is configured to perform sending/receiving-related operations on a first terminal device side in the foregoing method embodiments, and the processing unit 902 is configured to perform processing-related operations on the first terminal device side in the foregoing method embodiments. Alternatively, the apparatus 900 may be the second terminal device, or a chip or a circuit disposed in the second terminal device. The communication unit 901 is configured to perform sending/receiving-related operations on a second terminal device side in the foregoing method embodiments, and the processing unit 902 is configured to perform processing-related operations on the second terminal device side in the foregoing method embodiments. Alternatively, the apparatus 900 may be the network device, or a chip or a circuit disposed in the network device. The communication unit 901 is configured to perform sending/receiving-related operations on the network device side in the foregoing method embodiments, and the processing unit 902 is configured to perform processing-related operations on the network device side.

For example, the processing unit 902 is configured to obtain a second measurement result of a second terminal device, and determine, based on the second measurement result, whether there is a hidden node near the second terminal device.

Optionally, the communication apparatus is used for the network device. When obtaining the second measurement result of the second terminal device, the processing unit 902 is specifically configured to control the communication unit 901 to receive the second measurement result from the second terminal device, or control the communication unit 901 to receive the second measurement result from a first terminal device.

Optionally, the communication apparatus is used for the first terminal device. When obtaining the second measurement result of the second terminal device, the processing unit 902 is specifically configured to control the communication unit 901 to receive the second measurement result from the second terminal device, or control the communication unit 901 to receive the second measurement result from a network device.

It should be understood that division into the units in the foregoing apparatus is merely logical function division. During actual implementation, all or some of the units may be integrated into a physical entity, or may be physically separate. In addition, all the units in the apparatus may be implemented in a form of software invoked by a processing element, or may be implemented in a form of hardware or some units may be implemented in a form of software invoked by a processing element, and some units may be implemented in a form of hardware. For example, each unit may be a separate and independent processing element, or may be integrated into a chip of the apparatus for implementation. Herein, the unit may alternatively be stored in a memory in a form of a program, and is invoked by a processing element of the apparatus to perform a function of the unit. Herein, all or some of the units may be integrated, or may be implemented independently. The processing element herein may also be referred to as a processor, and may be an integrated circuit having a signal processing capability. In an implementation process, the steps of the foregoing methods or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the units in the apparatus may be implemented in a form of scheduling a program by a processing element, the processing element may be a general-purpose processor, for example, a central processing unit (Central Processing Unit, CPU) or another processor that can invoke a program. For another example, the units may be integrated together and implemented in a form of a system-on-a-chip (system-on-a-chip, SoC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 10:
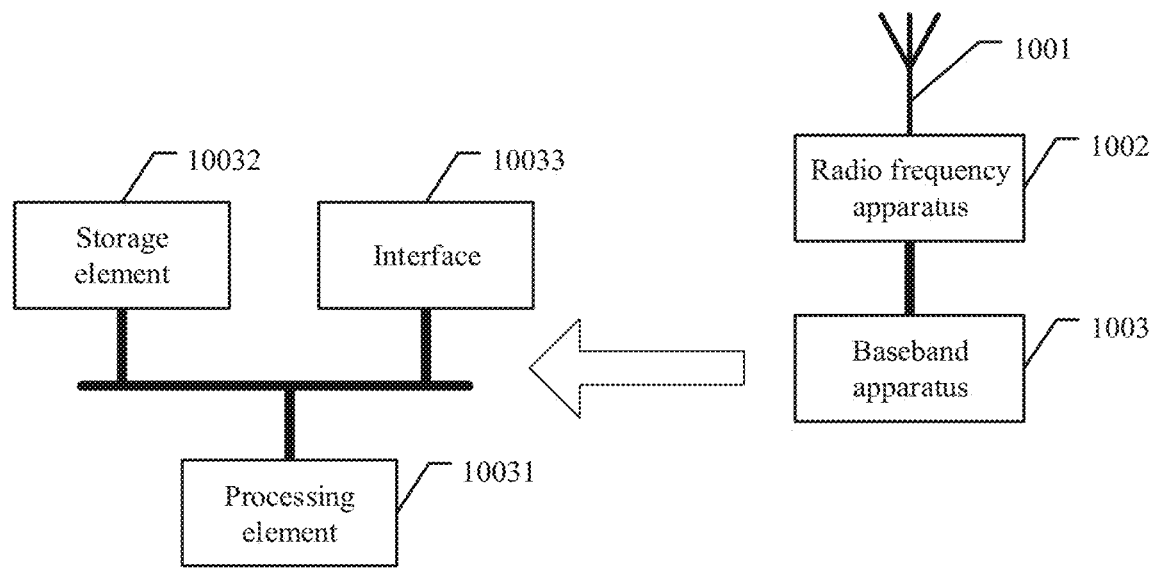
FIG. 10 is a schematic diagram of a structure of a network device according to an embodiment of this application.

FIG. 10 is a schematic diagram of a structure of a network device according to an embodiment of this application. The network device is configured to implement operations related to the network device in the foregoing embodiments. As shown in FIG. 10, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, through the antenna 1001, information sent by a terminal device, and sends, to the baseband apparatus 1003 for processing, the information sent by the terminal device. In a downlink direction, the baseband apparatus 1003 processes information of the terminal device, and sends the information to the radio frequency apparatus 1002. The radio frequency apparatus 1002 processes the information of the terminal device, and then sends the processed information to the terminal device through the antenna 1001.

The baseband apparatus 1003 may include one or more processing elements 10031, for example, include a main control CPU and another integrated circuit. Herein, the baseband apparatus 1003 may further include a storage element 10032 and an interface 10033. The storage element 10032 is configured to store a program and data. The interface 10033 is configured to exchange information with the radio frequency apparatus 1002. The interface is, for example, a common public radio interface (common public radio interface, CPRI). The foregoing apparatus used for the network device may be located in the baseband apparatus 1003. For example, the foregoing apparatus used for the network device may be a chip in the baseband apparatus 1003. The chip includes at least one processing element and an interface circuit. The processing element is configured to perform steps in any method performed by the communication apparatus in the procedure shown in FIG. 5 or FIG. 8, and the interface circuit is configured to communicate with another apparatus. In an implementation, the units of the network device for implementing the steps in the method shown in FIG. 5 or FIG. 8 may be implemented in a form of scheduling a program by the processing element. For example, the apparatus used in the network device includes a processing element and a storage element. The processing element invokes a program stored in the storage element, to perform the methods performed by the communication apparatus in the method embodiment shown in FIG. 5 or FIG. 8. The storage element may be a storage element that is located on a same chip as the processing element, namely, an on-chip storage element, or may be a storage element that is located on a different chip from the processing element, namely, an off-chip storage element.

In another implementation, the units of the network device for implementing steps in the method shown in FIG. 5 or FIG. 8 may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the network device for implementing the steps in the foregoing method may be integrated together, and implemented in a form of a system-on-a-chip (system-on-a-chip, SoC). For example, the baseband apparatus includes the SoC chip, configured to implement the method shown in FIG. 5 or FIG. 8. At least one processing element and storage element may be integrated into the chip, and the processing element invokes a program stored in the storage element to implement the foregoing method performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform the steps performed by the network device provided in the embodiment shown in FIG. 5 or FIG. 8. The processing element may perform some or all steps performed by the network device in a first manner, to be specific, by invoking the program stored in the storage element; or may perform some or all steps performed by the network device in a second manner, to be specific, by using a hardware integrated logic circuit in the processing element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

Figure 11:
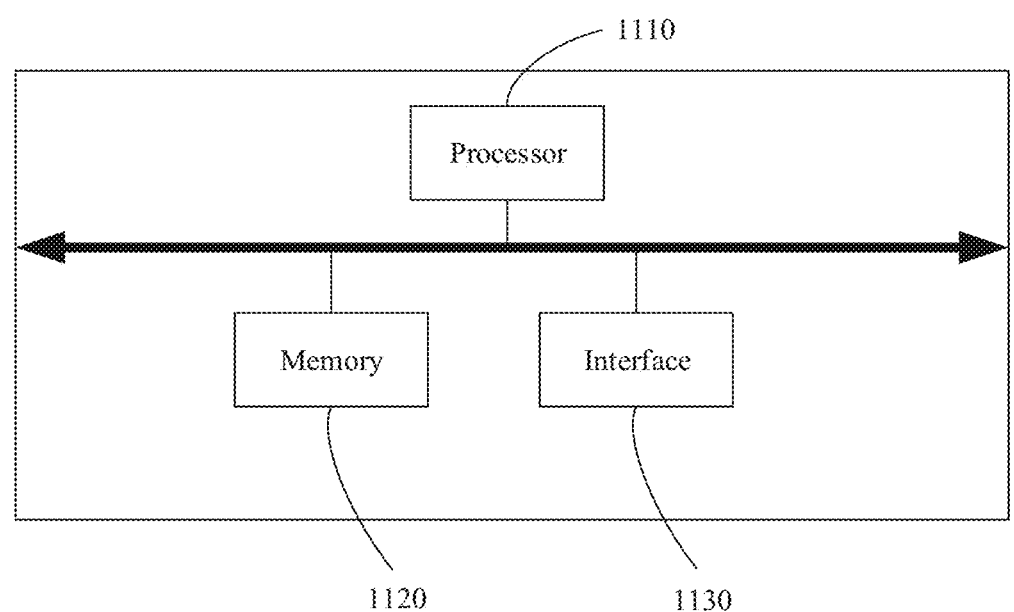
FIG. 11 is another schematic diagram of a structure of a network device according to an embodiment of this application.

FIG. 11 is another schematic diagram of a structure of a network device according to an embodiment of this application. The network device includes a processor 1110, a memory 1120, and an interface 1130, where the processor 1110, the memory 1120, and the interface 1130 are connected in a signal connection manner. The network device may be the communication apparatus in the procedure shown in FIG. 5 or FIG. 8, and is configured to implement the operation shown in FIG. 5 or FIG. 8 in the foregoing method embodiments.

The apparatus 900 shown in FIG. 9 may be located in the network device, and functions of units may be implemented by the processor 1110 by invoking a program stored in the memory 1120. That is, the apparatus 900 shown in FIG. 9 may include a memory and a processor. The memory is configured to store a program, and the program is invoked by the processor to perform the method in the method embodiment shown in FIG. 5 or FIG. 8. The processor herein may be an integrated circuit having a signal processing capability, for example, a CPU. Alternatively, the functions of the units shown in FIG. 9 may be implemented by one or more integrated circuits configured to implement the method shown in FIG. 5 or FIG. 8, for example, one or more ASICs, one or more microprocessors DSPs, one or more FPGAs, or a combination of at least two of these types of integrated circuits. Alternatively, the foregoing implementations may be combined.

Figure 12:
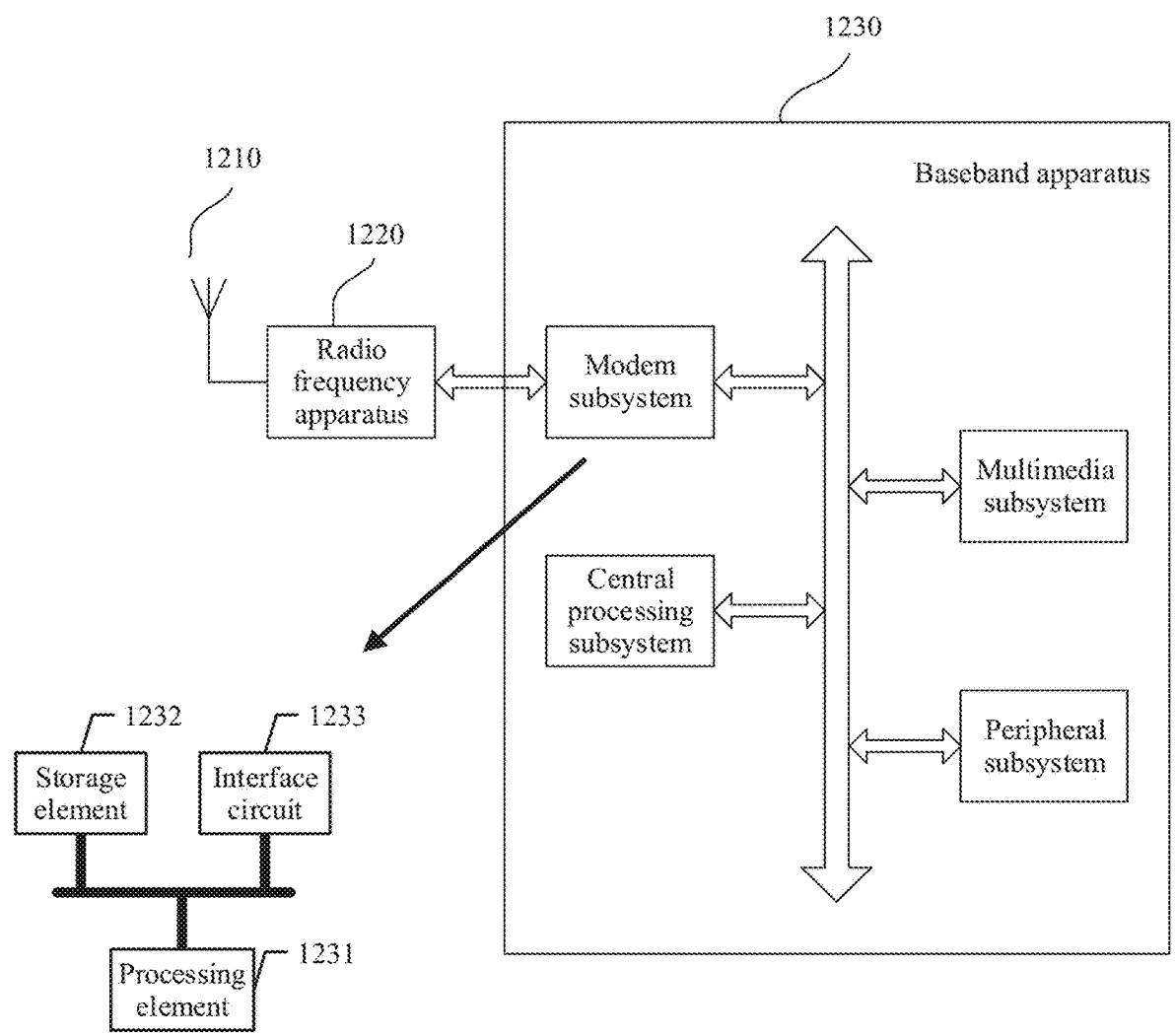
FIG. 12 is a schematic diagram of a structure of a terminal device according to an embodiment of this application.

FIG. 12 is a schematic diagram of a structure of a terminal device according to an embodiment of this application. The terminal device may be the communication apparatus in the embodiment shown in FIG. 5 or FIG. 8, and is configured to implement operations of the communication apparatus in the embodiment shown in FIG. 5 or FIG. 8. As shown in FIG. 12, the terminal device includes an antenna 1210, a radio frequency apparatus 1220, and a signal processing part 1230. The antenna 1210 is connected to the radio frequency apparatus 1220. In a downlink direction, the radio frequency apparatus 1220 receives, through the antenna 1210, information sent by a network device, and sends, to the signal processing part 1230 for processing, the information sent by the network device. In an uplink direction, the signal processing part 1230 processes the information of the network device, and sends the information to the radio frequency apparatus 1220. The radio frequency apparatus 1220 processes the information of the network device, and then sends processed information to a terminal device through the antenna 1210.

The signal processing part 1230 may include a modem subsystem, configured to process data at each communication protocol layer. The signal processing part 1230 may further include a central processing subsystem, configured to process an operating system and an application layer of the terminal device. In addition, the signal processing part 1230 may further include another subsystem, for example, a multimedia subsystem or a peripheral subsystem. The multimedia subsystem is configured to control a camera, a screen display, and the like of the terminal device. The peripheral subsystem is configured to connect to another device. The modem subsystem may be a chip that is separately disposed. Optionally, the foregoing apparatus used in the terminal device may be located in the modem subsystem.

The modem subsystem may include one or more processing elements 1231, for example, include a main control CPU and another integrated circuit. In addition, the modem subsystem may further include a storage element 1232 and an interface circuit 1233. The storage element 1232 is configured to store data and a program. However, a program used to perform the method performed by the communication apparatus in the method shown in FIG. 5 or FIG. 8 may not be stored in the storage element 1232, but is stored in a memory outside the modem subsystem, and is loaded and used by the modem subsystem when to be used. The interface circuit 1233 is configured to communicate with another subsystem. The foregoing apparatus used in the terminal device may be located in the modem subsystem, and the modem subsystem may be implemented by using a chip. The chip includes at least one processing element and an interface circuit. The processing element is configured to perform the steps of any one of the methods performed by the communication apparatus in the method shown in FIG. 5 or FIG. 8. The interface circuit is configured to communicate with another apparatus. In an implementation, units of the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the communication apparatus in the method embodiment shown in FIG. 5 or FIG. 8. The storage element may be a storage element located on a same chip as the processing element, namely, an on-chip storage element.

In another implementation, a program used to perform the methods performed by the communication apparatus in the method shown in FIG. 5 or FIG. 8 may be in a storage element that is on a different chip from the processing unit, that is, an off-chip storage element. In this case, the processing element invokes or loads the program from the off-chip storage element to the on-chip storage element, to invoke and perform the methods performed by the communication apparatus in the method embodiment shown in FIG. 5 or FIG. 8.

In still another implementation, units of the terminal device for implementing the steps in the method shown in FIG. 5 or FIG. 8 may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal device for implementing the steps in the method shown in FIG. 5 or FIG. 8 may be integrated together, and implemented in a form of a system-on-a-chip (system-on-a-chip, SoC). The SoC chip is configured to implement the method shown in FIG. 5 or FIG. 8. At least one processing element and storage element may be integrated into the chip, and a processing element invokes a program stored in a storage element to implement the foregoing methods performed by the terminal device. Alternatively, at least one integrated circuit may be integrated into the chip, to implement the methods performed by the communication apparatus in the procedure shown in FIG. 5 or FIG. 8. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods performed by the terminal device provided in the method embodiment shown in FIG. 5 or FIG. 8. The processing element may perform some or all steps performed by the terminal device, in a first manner, to be specific, by invoking the program stored in the storage element, or may perform some or all steps performed by the terminal device, in a second manner, to be specific, by using a hardware integrated logic circuit in the processing element in combination with instructions; or may certainly perform, by combining the first manner and the second manner, some or all steps performed by the terminal device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

Further, an embodiment of this application further provides an apparatus, including units configured to implement the steps in the procedure shown in FIG. 5 or FIG. 8. Alternatively, the apparatus includes at least one processor and an interface circuit, where the at least one processor is configured to communicate with another apparatus through the interface, and perform the steps of the method in the procedure shown in FIG. 5 or FIG. 8. Alternatively, the apparatus includes a processor, configured to invoke a program stored in a memory, to perform the steps of the method in the procedure shown in FIG. 5 or FIG. 8.

An embodiment of this application further provides a computer-readable storage medium, including a program. When the program is run by a processor, the steps of the method in the procedure shown in FIG. 5 or FIG. 8 is performed. An embodiment of this application further provides a chip system. The chip system includes a processor, and may further include a memory, configured to implement the method in the procedure shown in FIG. 5 or FIG. 8. The chip system may include a chip, or may include a chip and another discrete device. An embodiment of this application further provides a computer program product, including instructions. When the computer program product runs on a computer, the computer is enabled to perform the method shown in FIG. 5 or FIG. 8. An embodiment of this application further provides a system, including at least one of the first terminal device, the second terminal device, or the network device in the foregoing embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps in the methods disclosed with reference to embodiments of this application may be directly performed by a hardware processor, or may be performed by a combination of hardware in the processor and a software module.

In this embodiment of this application, the memory may be a nonvolatile memory, such as a hard disk drive (hard disk drive, HDD) or a solid-state drive (solid-state drive, SSD), or may be a volatile memory (volatile memory), such as a random access memory (random access memory RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

Obviously, a person skilled in the art can make various modifications and variations to this application without departing from the scope of this application. In this way, this application is intended to cover these modifications and variations of this application provided that they fall within the scope of the claims of this application and their equivalent technologies.

In embodiments of this application, "at least one" means one or more, and "a plurality of" means two or more. The term and/or describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

What is claimed is:

1. A method for determining a hidden node, comprising:
    obtaining, by a communication apparatus, a first measurement result of a first terminal device and a second measurement result of a second terminal device, wherein
    the first measurement result comprises a measurement result of the first terminal device based on a received signal strength indication (RSSI) obtained through measurement in a first frequency range, the second measurement result comprises a measurement result of the second terminal device based on an RSSI obtained through measurement in the first frequency range, and the first terminal device performs sidelink communication with the second terminal device in the first frequency range; and
    determining, by the communication apparatus based on a comparison of the first measurement result and the second measurement result, that there is a hidden node for the second terminal device.

2. The method according to claim 1, wherein the first measurement result comprises a first RSSI, the first RSSI is an average value of one or more RSSIs obtained by the first terminal device through measurement in the first frequency range, the second measurement result comprises a second RSSI, and the second RSSI is an average value of one or more RSSIs obtained by the second terminal device through measurement in the first frequency range; and the determining, by the communication apparatus based on the first measurement result and the second measurement result, that there is a hidden node for the second terminal device comprises:
    when a difference between the second RSSI and the first RSSI is greater than or equal to a first threshold, determining, by the communication apparatus, that there is the hidden node for the second terminal device.

3. The method according to claim 1, wherein the first measurement result comprises a first channel occupancy, the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range, the second measurement result comprises a second channel occupancy, and the second channel occupancy is a ratio of a quantity of RSSIs that are obtained by the second terminal device through measurement in the first frequency range and that are greater than a threshold to a total quantity of RSSIs obtained by the second terminal device through measurement in the first frequency range; and the determining, by the communication apparatus based on the first measurement result and the second measurement result, that there is a hidden node for the second terminal device comprises:
    when a difference between the second channel occupancy and the first channel occupancy is greater than or equal to a second threshold, determining, by the communication apparatus, that there is the hidden node for the second terminal device.

4. The method according to claim 1, wherein the first measurement result comprises a first channel occupancy, the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range, the second measurement result comprises a second channel occupancy, and the second channel occupancy is the ratio of the quantity of RSSIs that are obtained by the second terminal device through measurement in the first frequency range and that are greater than the threshold to the total quantity of RSSIs obtained by the second terminal device through measurement in the first frequency range; and the method further comprises:

determining, by the communication apparatus based on the first channel occupancy and the second channel occupancy, a level of impact of the hidden node on the sidelink communication between the first terminal device and the second terminal device.

5. The method according to claim 1, wherein the communication apparatus is used for a network device, and the obtaining, by a communication apparatus, a first measurement result of a first terminal device and a second measurement result of a second terminal device comprises:

receiving, by the network device, a first measurement report and a second measurement report from the second terminal device, wherein the first measurement report carries the first measurement result, and the second measurement report carries the second measurement result; or receiving, by the network device, a third measurement report from the second terminal device, wherein the third measurement report carries the first measurement result and the second measurement result; or receiving, by the network device, a first measurement report from the first terminal device, wherein the first measurement report carries the first measurement result, and receiving, by the network device, a second measurement report from the second terminal device, wherein the second measurement report carries the second measurement result; or receiving, by the network device, a first measurement report and a second measurement report from the first terminal device, wherein the first measurement report carries the first measurement result, and the second measurement report carries the second measurement result; or receiving, by the network device, a fourth measurement report from the first terminal device, wherein the fourth measurement report carries the first measurement result and the second measurement result.

6. The method according to claim 1, wherein the communication apparatus is used for the second terminal device, and the obtaining, by a communication apparatus, a first measurement result of a first terminal device and a second measurement result of a second terminal device comprises:

receiving, by the second terminal device, a first measurement report from the first terminal device, wherein the first measurement report carries the first measurement result; and obtaining, by the second terminal device, the second measurement result through RSSI measurement.

7. The method according to claim 6, wherein the obtaining, by the second terminal device, the second measurement result through RSSI measurement comprises:

performing, by the second terminal device, RSSI measurement in the first frequency range based on second RSSI measurement configuration information; and obtaining, by the second terminal device, the second measurement result based on a result of the RSSI measurement.

8. The method according to claim 6, wherein the method further comprises:

sending, by the second terminal device, first indication information to a network device, wherein the first indication information comprises one or more of the following: indication information used to indicate whether there is the hidden node, identifier information of the first frequency range, identifier information of the first terminal device, identifier information of the second terminal device, indication information indicating a level of an impact of the hidden node on the sidelink communication between the first terminal device and the second terminal device, or identifier information of a sidelink that is between the first terminal device and the second terminal device and that is used for sidelink communication.

9. The method according to claim 1, wherein the communication apparatus is used for the first terminal device, and the obtaining, by a communication apparatus, a first measurement result of a first terminal device and a second measurement result of a second terminal device comprises:

receiving, by the first terminal device, a second measurement report from the second terminal device, wherein the second measurement report carries the second measurement result; and obtaining, by the first terminal device, the first measurement result through RSSI measurement.

10. The method according to claim 9, wherein the obtaining, by the first terminal device, the first measurement result through RSSI measurement comprises:

performing, by the first terminal device, RSSI measurement based on first RSSI measurement configuration information; and obtaining, by the first terminal device, the first measurement result based on a result of the RSSI measurement.

11. The method according to claim 9, wherein the method further comprises:

sending, by the first terminal device, second indication information to a network device, wherein the second indication information comprises one or more of the following: indication information used to indicate whether there is the hidden node, identifier information of the first frequency range, identifier information of the first terminal device, identifier information of the second terminal device, indication information indicating a level of an impact of the hidden node on the sidelink communication between the first terminal device and the second terminal device, or identifier information of a sidelink that is between the first terminal device and the second terminal device and that is used for sidelink communication.

12. The method according to claim 5, wherein at least one of the first measurement report, the second measurement report, the third measurement report, or the fourth measurement report further comprises one or more of the following: identifier information of the first frequency range, identifier information of the first terminal device, identifier information of the second terminal device, or identifier information of a sidelink that is between the first terminal device and the second terminal device and that is used for sidelink communication.

13. An apparatus, comprising:
one or more processors;
a non-transitory memory coupled to the one or more processors, wherein the non-transitory memory stores a program to be executed by the one or more processors, the program including instructions for:

obtaining, by apparatus, a first measurement result of a first terminal device and a second measurement result of a second terminal device, wherein the first measurement result comprises a measurement result of the first terminal device based on a received signal strength indication (RSSI) obtained through measurement in a first frequency range, the second measurement result comprises a measurement result of the second terminal device based on an RSSI obtained through measurement in the first frequency range, and the first terminal device performs sidelink communication with the second terminal device in the first frequency range; and determining, by the apparatus based on a comparison of the first measurement result and the second measurement result, that there is a hidden node for the second terminal device.

14. The apparatus according to claim 13, wherein the first measurement result comprises a first RSSI, the first RSSI is an average value of one or more RSSIs obtained by the first terminal device through measurement in the first frequency range, the second measurement result comprises a second RSSI, and the second RSSI is an average value of one or more RSSIs obtained by the second terminal device through measurement in the first frequency range; and the determining, by the apparatus based on the first measurement result and the second measurement result, that there is a hidden node for the second terminal device comprises:

when a difference between the second RSSI and the first RSSI is greater than or equal to a first threshold, determining, by the apparatus, that there is the hidden node for the second terminal device.

15. The apparatus according to claim 13, wherein the first measurement result comprises a first channel occupancy, the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range, the second measurement result comprises a second channel occupancy, and the second channel occupancy is a ratio of a quantity of RSSIs that are obtained by the second terminal device through measurement in the first frequency range and that are greater than a threshold to a total quantity of RSSIs obtained by the second terminal device through measurement in the first frequency range; and the determining, by the apparatus based on the first measurement result and the second measurement result, that there is a hidden node for the second terminal device comprises:

when a difference between the second channel occupancy and the first channel occupancy is greater than or equal to a second threshold, determining, by the apparatus, that there is the hidden node for the second terminal device.

16. The apparatus according to claim 13, wherein the first measurement result comprises a first channel occupancy, the first channel occupancy is a ratio of a quantity of RSSIs that are obtained by the first terminal device through measurement in the first frequency range and that are greater than a threshold to a total quantity of RSSIs obtained by the first terminal device through measurement in the first frequency range, the second measurement result comprises a second channel occupancy, and the second channel occupancy is the ratio of the quantity of RSSIs that are obtained by the second terminal device through measurement in the first frequency range and that are greater than the threshold to the total quantity of RSSIs obtained by the second terminal device through measurement in the first frequency range; and the program including instructions for:

determining, by the apparatus based on the first channel occupancy and the second channel occupancy, a level of impact of the hidden node on the sidelink communication between the first terminal device and the second terminal device.

17. The apparatus according to claim 13, wherein the apparatus is used for a network device, and the obtaining, by the apparatus, a first measurement result of a first terminal device and a second measurement result of a second terminal device comprises:

receiving, by the network device, a first measurement report and a second measurement report from the second terminal device, wherein the first measurement report carries the first measurement result, and the second measurement report carries the second measurement result; or receiving, by the network device, a third measurement report from the second terminal device, wherein the third measurement report carries the first measurement result and the second measurement result; or receiving, by the network device, a first measurement report from the first terminal device, wherein the first measurement report carries the first measurement result, and receiving, by the network device, a second measurement report from the second terminal device, wherein the second measurement report carries the second measurement result; or receiving, by the network device, a first measurement report and a second measurement report from the first terminal device, wherein the first measurement report carries the first measurement result, and the second measurement report carries the second measurement result; or receiving, by the network device, a fourth measurement report from the first terminal device, wherein the fourth measurement report carries the first measurement result and the second measurement result.

18. The apparatus according to claim 13, wherein the apparatus is used for the second terminal device, and the obtaining, by the apparatus, a first measurement result of a first terminal device and a second measurement result of a second terminal device comprises:

receiving, by the second terminal device, a first measurement report from the first terminal device, wherein the first measurement report carries the first measurement result; and obtaining, by the second terminal device, the second measurement result through RSSI measurement.

19. The apparatus according to claim 18, wherein the obtaining, by the second terminal device, the second measurement result through RSSI measurement comprises:

performing, by the second terminal device, RSSI measurement in the first frequency range based on second RSSI measurement configuration information; and obtaining, by the second terminal device, the second measurement result based on a result of the RSSI measurement.

20. A non-transitory computer readable medium, wherein the non-transitory computer readable medium stores instructions that are executable by a computer, and the instructions comprise instructions for:

obtaining, a first measurement result of a first terminal device and a second measurement result of a second terminal device, wherein the first measurement result comprises a measurement result of the first terminal device based on a received signal strength indication (RSSI) obtained through measurement in a first frequency range, the second measurement result comprises a measurement result of the second terminal device based on an RSSI obtained through measurement in the first frequency range, and the first terminal device performs sidelink communication with the second terminal device in the first frequency range; and determining, based on a comparison of the first measurement result and the second measurement result, that there is a hidden node for the second terminal device.

* * * * *